United States Patent
Sirotkin et al.

(10) Patent No.: US 10,257,753 B2
(45) Date of Patent: Apr. 9, 2019

(54) WLAN MOBILITY FOR LTE/WLAN AGGREGATION

(71) Applicant: Intel IP Corporation, Santa Clara, CA (US)

(72) Inventors: Alexander Sasha Sirotkin, Petach Tikva (IL); Nageen Himayat, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/568,981

(22) PCT Filed: Dec. 18, 2015

(86) PCT No.: PCT/US2015/066802
§ 371 (c)(1),
(2) Date: Oct. 24, 2017

(87) PCT Pub. No.: WO2016/190902
PCT Pub. Date: Dec. 1, 2016

(65) Prior Publication Data
US 2018/0132143 A1 May 10, 2018
US 2019/0007869 A9 Jan. 3, 2019

Related U.S. Application Data

(60) Provisional application No. 62/166,423, filed on May 26, 2015.

(51) Int. Cl.
*H04W 36/00* (2009.01)
*H04W 36/08* (2009.01)
(Continued)

(52) U.S. Cl.
CPC ... *H04W 36/0061* (2013.01); *H04W 36/0083* (2013.01); *H04W 36/08* (2013.01);
(Continued)

(58) Field of Classification Search
CPC ..... H04W 84/12; H04W 88/06; H04W 76/15; H04W 36/14; H04W 76/16; H04W 36/08;
(Continued)

(56) References Cited

U.S. PATENT DOCUMENTS

2007/0076662 A1  4/2007  Jain et al.
2014/0064068 A1  3/2014  Horn et al.
(Continued)

FOREIGN PATENT DOCUMENTS

EP       2624522 A1    8/2013
WO   2015/187284 A1   12/2015

OTHER PUBLICATIONS

International Search Report dated Mar. 17, 2016 for International Application PCT/US2015/066802.
(Continued)

*Primary Examiner* — Daniel Lai
(74) *Attorney, Agent, or Firm* — Eschweiler & Potashnik, LLC

(57) ABSTRACT

A network device (e.g., an evolved Node B (eNB), user equipment (UE) or the like) can operate wireless local area network (WLAN) mobility between groups of WLAN access points (APs) in LTE/WLAN aggregation based on control by the eNB and further between WLAP APs within a particular group based on control by the UE. A long term evolution (LTE) link can communicate a first set of WLAN data related to a first set of WLAN access points (APs) that enables the UE to generate a WLAN mobility operation from a first WLAN AP to a second WLAN AP within the first set of WLAN APs based on a determination generated by the UE. The UE can be prompted by the eNB to also select another WLAN AP of the second set of WLAN APs coupled to a different WLAN Termination or logic node.

23 Claims, 11 Drawing Sheets

(51) Int. Cl.
*H04W 36/30* (2009.01)
*H04W 84/12* (2009.01)
*H04W 88/06* (2009.01)
*H04W 76/22* (2018.01)
*H04W 72/12* (2009.01)
*H04W 76/12* (2018.01)

(52) U.S. Cl.
CPC ....... *H04W 36/30* (2013.01); *H04W 72/1215* (2013.01); *H04W 76/22* (2018.02); *H04W 84/12* (2013.01); *H04W 88/06* (2013.01); *H04W 76/12* (2018.02)

(58) Field of Classification Search
CPC ..... H04W 76/27; H04W 36/30; H04W 12/04; H04W 12/08; H04W 48/18; H04W 36/0083; H04W 72/085; H04W 36/00; H04W 36/0061; H04W 76/22; H04W 88/08; H04W 16/14; H04W 28/08; H04W 24/02; H04W 36/22; H04W 48/20; H04W 72/1215; H04W 76/10; H04W 72/04; H04W 72/1278; H04W 36/0016; H04W 36/0022; H04W 36/0069; H04W 36/00835; H04W 36/00837; H04W 36/0094; H04W 76/30; H04W 36/0044; H04W 36/0055; H04W 36/0066; H04W 36/023; H04W 36/245; H04W 36/38; H04W 40/12; H04W 40/24; H04W 72/01
See application file for complete search history.

(56) References Cited

U.S. PATENT DOCUMENTS

| | | | |
|---|---|---|---|
| 2015/0016414 A1* | 1/2015 | Hwang | H04W 36/0079 370/331 |
| 2016/0302122 A1* | 10/2016 | Masini | H04L 61/1511 |
| 2016/0337485 A1* | 11/2016 | Nuggehalli | H04L 47/825 |
| 2016/0338133 A1* | 11/2016 | Lee | H04W 76/025 |

OTHER PUBLICATIONS

"UP architecture and required functions for LTE/WLA aggregation." Agenda Item: 7.6.3. Source MediaTek Inc. 3GPP TSG-RAN2 #89bis Meeting, Bratislava, Slovakia, Apr. 20-24, 2015. R2-151358, 4 pages.

"Discussion on LTE-WLAN Aggregation Prodecure." Agenda Item: 7.6.2.1. Source: ITRI. 3GPP TSG-RAN WG2 Meeting#90. May 25-May 29, 2015, Fukuoka, Japan. Tdoc R2-152360, 3 pages.

"Further considerations on the user plane architecture for LTE-WiFi aggregation." Agenda Item: 7.6.2.2, Source: Alcatel-Lucent, Alcatel-Lucent Shanghai Bell. 3GPP TSG-RAN WG2 Meeting #90. Fukuoka, Japan, May 25-29, 2015. R2-152616, 3 pages.

"Overview RAN on LTE-WLAN aggregation and interworking." Agenda Item: 7.10.1. Source: Intel Corporation. 3GPP TSG-RAN WG4 Meeting #76bis, Sophia Antipolis, France, Oct. 12-16, 2015. R4-155631. 7 pages.

* cited by examiner

WLAN MOBILITY FOR LTE/WLAN AGGREGATION

REFERENCE TO RELATED APPLICATIONS

This application is a National Phase entry application of International Patent Application No. PCT/US2015/066802 filed Dec. 18, 2015, which claims priority to U.S. Provisional Application 62/166,243 filed on May 26, 2015, entitled "INTRA-WLAN MOBILITY (WLAN AP CHANGE) PROCEDURES FOR LTE/WLAN AGGREGATION" in the name of Alexander Sirotkin et al. and is hereby incorporated by reference in their entirety.

FIELD

The present disclosure relates to wireless communications, and more specifically, to wireless local area network (WLAN) mobility for wireless communications with long term evolution (LTE)/WLAN aggregation.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the UE. The downlink (DL) transmission can be a communication from the node (e.g., eNB) to the UE, and the uplink (UL) transmission can be a communication from the wireless device to the node. In LTE, data can be transmitted from the eNB to the UE via a physical downlink shared channel (PDSCH). A physical uplink control channel (PUCCH) can be used to acknowledge that data was received. Downlink and uplink channels can use time-division duplexing (TDD) or frequency-division duplexing (FDD).

In homogeneous networks, the node, also called a macro node, can provide wireless coverage to wireless devices in a cell or cell network. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro eNBs) overlaid with layers of lower power nodes (small eNBs, micro-eNBs, pico-eNBs, femto-eNBs, home eNBs (HeNBs) or other network devices) that can be deployed in a less well planned or even entirely uncoordinated manner within the coverage area (cell) of a macro node. The lower power nodes (LPN s) can generally be referred to as "low power nodes", small nodes, or small cells, for example.

DETAILED DESCRIPTION

Figure 1:
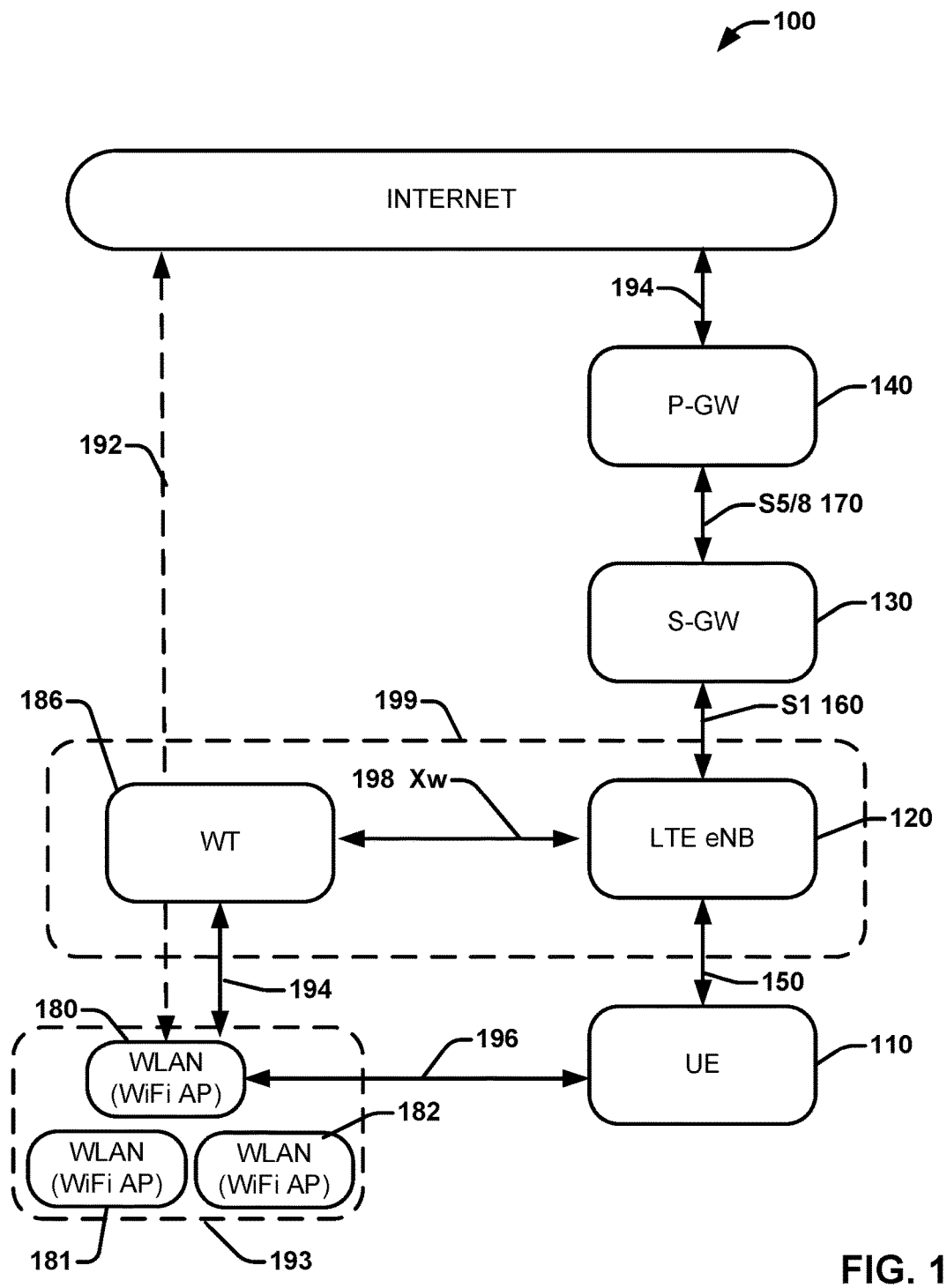
FIG. 1 illustrates a block diagram illustrating an example radio access network (RAN) anchored wireless wireless local area network (WLAN) wireless communications network environment for a UE or eNB according to various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, various embodiments or aspects disclosed provide for WLAN mobility (WLAN roaming/WLAN access point (AP) change) in a heterogeneous network environment of different radio access technologies (RATs) between a UE and different WLAN Access Points (APs) as part of LTE/WLAN Aggregation protocols. The network configuration can enable WLAN mobility based on a hybrid of eNB/UE control, in which the UE first initiates WLAN mobility in some cases, and in other cases a serving eNB initiates WLAN mobility. WLAN mobility can be when a UE moves out of one WLAN AP network coverage zone and into another WLAN AP coverage network zone, where both WLAN APs support LTE/WLAN Aggregation and network (backhaul) connectivity is to the same eNB. This UE mobility can be referred to as intra-WLAN mobility, which can be a UE mobility between WLAN APs, either within a same group or among groups of WLAN APs.

Various mobility scenarios within the network are envisioned. For example, WLAN mobility can be between WLAN APs of a same group or between groups of WLAN APs. The groups of WLAN APs can also be referred to as sets or as a WLAN mobility set. A WLAN mobility set can be a set of one or more WLAN APs identified by one or more basic service set identifiers (BSSIDs)/homogeneous extended service set identifier (HESSID)/service set identifier (SSIDs), within which WLAN mobility mechanisms apply while the UE is configured with LTE WLAN aggregation (LWA) bearer(s), i.e., the UE may perform mobility between WLAN APs belonging to the mobility set without informing the eNB.

The eNB can provide the UE with data related to a WLAN mobility set. The data, for example, can identify or enable a connection between the UE and any WLAN AP of the particular WLAN mobility set. In one aspect, the data can comprise one or more WLAN AP identifiers, WLAN AP authentication/security keys, WLAN AP priorities or rankings, or other properties or parameters related to the WLAN APs of the WLAN mobility set. When the UE is configured with data related to the WLAN mobility set, it can attempt to connect to a WLAN AP whose identifiers match the ones of the configured mobility set. UE mobility to WLAN APs not belonging to the UE mobility set can controlled by the eNB (e.g. updating the WLAN mobility set based on measurement reports provided by the UE). A UE is connected to at most one mobility set at a time and can opt to generate a WLAN mobility between WLAN APs of a WLAN mobility set without notice to the eNB.

In another aspect, the WLAN APs belonging to the same WLAN mobility set can share a common WLAN Termination (WT), which can operate to terminate an Xw interface in the control plane or the user plane (e.g., an Xw-C and Xw-U). The termination endpoints for Xw-C and Xw-U can differ. The WLAN identifiers belonging to a mobility set can also be a subset of all WLAN identifiers associated to the WT. As used herein, a WT can refer to a WLAN logical node, or, in other words, a logical node that terminates the Xw interface on the WLAN side of the network. The WLAN logical node can be a logical node as defined in 3GPP that can be implemented in an AP, an access controller (AC), the eNB, a network entity, or any other network node on the WLAN side).

The operations generated by network devices (e.g., eNB(s), WT(s), WLAN AP(s), UE(s), network entities, or other network devices) disclosed can be based on facilitating mobility operations and minimizing or equalizing the relative transmission delays across multiple links. The optimal solutions can lend themselves to processes as solutions, which rely on minimal exchange of information related to the state of the WLAN RATs, thereby making them especially amenable to implementation with non-collocated WLAN/WT/LTE deployments, but can also be implemented with collated WLAN/WT/LTE deployments.

The proposed embodiments or aspects described can be applicable to DL bearer operations in particular, but does not exclude UL operations for both collocated and non-collocated WLAN AP/WT/LTE deployments. The processes or operation disclosed can be dynamic and allow for decisions based on real-time measurements of heterogeneous network metrics, accounting for link quality, congestion, propagation delays, signal properties (e.g., SINR, SNR, etc.) and traffic requirements for each UE across LTE, WTs and WLAN APs, for example. Additional aspects and details of the disclosure are further described below with reference to figures.

FIG. 1 illustrates a 3GPP RAN anchored WLAN network architectures 100 for LWA, which could be standardized by the 3GPP RAN working groups 2 and 3 in the forthcoming 13th release of the 3GPP standardization.

The network architecture 100 can comprise an end-to-end network for cellular communications, including a UE 110, an eNB 120, and the following two gateway entities of an evolved packet core (EPC): a serving gateway (S-GW) 130 and a packet data network (PDN) gateway (PDN GW, or P-GW) 140. One of ordinary skill in the art will recognize that an EPC typically includes other network entities and interfaces not further detailed such as the connections to the internet 192, or 194, for example.

The UE 110 can communicate with the eNB 120 through an air interface 150 (e.g., Uu 150, also referred to as a cellular link), which can comprise a wireless radio communication channel defined in 3GPP standards for long term evolution (LTE) wireless networks or be considered an LTE link, for example. The UE 110 can also operate as a dual connected device or dual radio UE 110 by being communicatively coupled to a WiFi interface/WLAN link 196 or one or more other communication links/interfaces on the network concurrently or at the same time.

The S-GW 130, in communication with the eNB 120 through an S1 interface 160, can provide a point of interconnect between the wireless radio side and the EPC side of the network architecture 100, as a co-located/non-collocated eNB, in which "collocated" refers to the LTE AP (e.g., the eNB) being located in the same network device or component. Network devices herein can be a gateway support node device, a cellular management entity device, a packet data gateway device, an eNB, for example, as well as other network devices functionally serving network communications for UEs and combinations of these devices communicatively coupled to one another.

The S-GW 130 can comprise an anchor point for the intra-LTE mobility, i.e., in case of a handover between eNBs and between LTE and other 3GPP access points or network devices. The S-GW 130 is logically connected to the other gateway, the P-GW 140, through an S5/8 interface 170. 3GPP standards specify separately the S-GW 130 and the P-GW 140, but in practice, these gateways can be combined as a common network component provided by a network equipment vendor. The P-GW 140 further provides a point of interconnect between the EPC and an external internet protocol (IP) network (not shown). An external IP network can also be called a packet data network (PDN). The P-GW 140 can route IP packets to and from PDNs, such as the "INTERNET", as labeled.

In addition to the aforementioned end-to-end cellular network components, FIG. 1 further illustrates that the UE 110 can communicate to a WLAN 180 via an interface or link 196, and can also be connected to the eNB 120 via interface 150 (e.g., Uu interface or other link). The UE 110 can be independently, concurrently or simultaneously connect to the LTE eNB 120 and the WLAN AP 180 via interfaces 196 and 150, respectively. Although WLAN is discussed herein as an example, the present disclosure envisions and is otherwise applicable other RATs (e.g., WiGig or other RATs) that can operate according to similar aspects or embodiments being discussed.

In addition, the LTE eNB 120 can communicate to the WLAN 180 via a WT 186, which is a logical node that terminates the Xw interface, Xw link 198 (e.g., an $X_2$ or Xw-C link), or Xw interface over a control plane protocol and an interface or link 194 on the WLAN side. The communication link/interface 194 can also be coupled to a WLAN mobility set 193, which is a set of one or more WLAN APs that can be identified by one or more BSSID/HESSID/SSIDs, within which WLAN mobility operations apply while the UE is configured with LWA bearer(s), i.e., the UE may perform mobility between WLAN APs belonging to the WLAN mobility set without informing the eNB 120.

Additionally or alternatively, the WT 186 can be linked via interface 194 to the WLAN APs 180-182, for example, independent based on each WLAN AP 180-182 belonging to or being identified with the WLAN mobility set 193. The user plane protocol can comprise a general packet radio service (GPRS) tunneling protocol for a user plane (GTP-U) with the eNB 120 and the control plane protocol can comprise an Xw application protocol (Xw-AP), for example.

Figure 2:
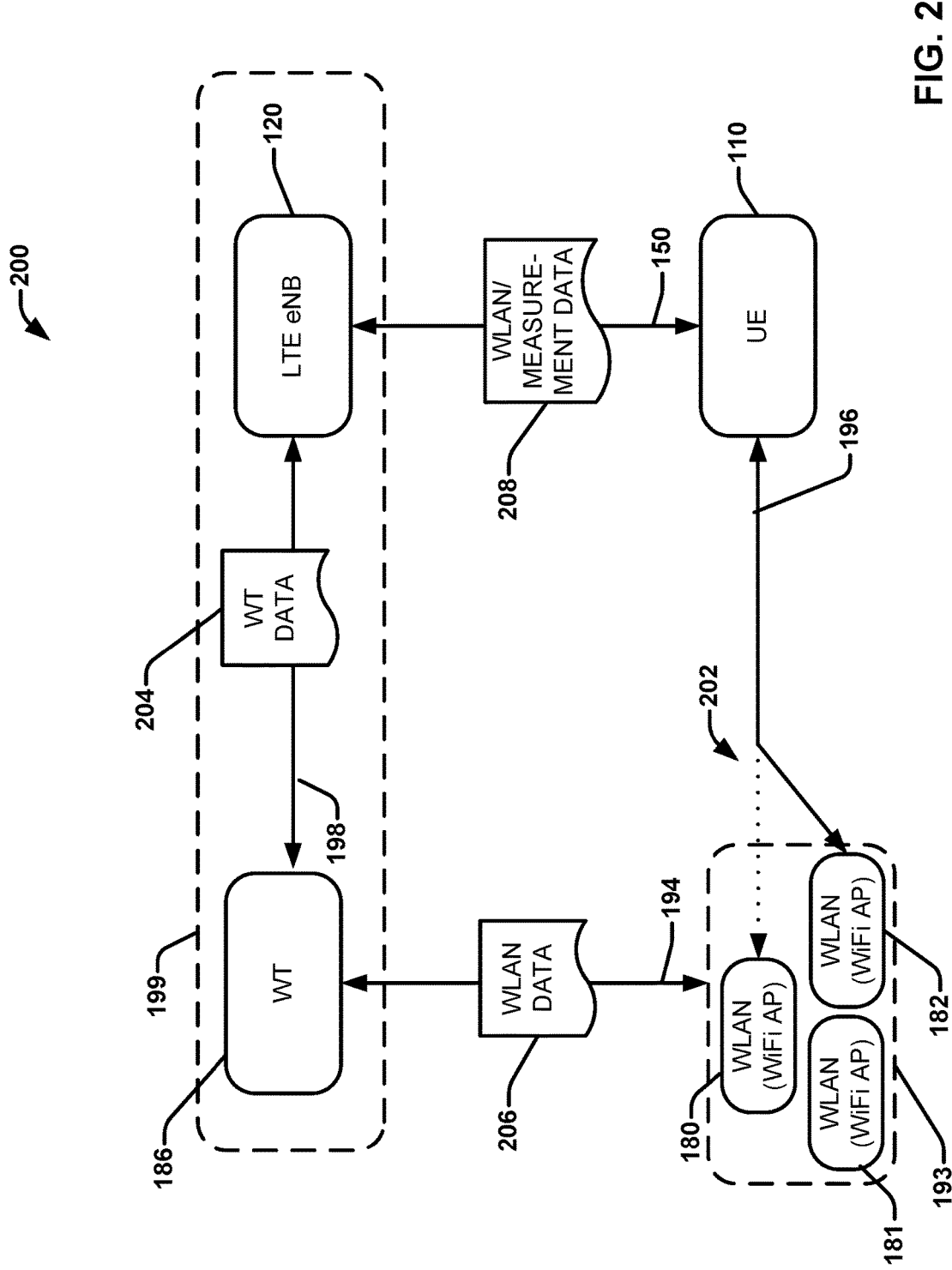
FIG. 2 illustrates another wireless communications network system for a UE or eNB to implement a WLAN mobility operation according to various aspects.

Referring now to FIG. 2, illustrates an example network architecture 200 that enables LWA operation for WLAN mobility in accordance with various aspects or embodiments. The network architecture can comprise evolved universal terrestrial radio access network (EUTRAN) protocol architecture that can support LWA operation whereby a UE 110 in a radio resource control (RRC) connection or otherwise can be configured by the eNB 120 to utilize radio resources of different RATs such as LTE and WLAN, for example. Both non-collocated and collocated scenarios can be supported depending on the backhaul connection between LTE and WLAN. The network architecture with the network devices and the UE 110 can operate WLAN mobility based on a hybrid combination of both eNB 120 and UE 110 controlled WLAN mobility operations. Therefore, some WLAN mobility operations can be controlled independently by the eNB 120 under certain network circumstances and other WLAN mobility operations can be controlled independently by the UE 110 under other network circumstances.

In an embodiment, the UE 110, for example, can independently control or initiate a WLAN mobility operation 202 based on its own measurements or status reports. The UE 110 can initiate an interface connection switching process from a first WLAN AP 180 to another WLAN AP (e.g., WLAN AP 182) within the same WLAN mobility set 193 independently of communications with the eNB 120 during the switching. For example, the UE 110 can perform or control the WLAN mobility operation 202 from a first WLAN AP 180 to a second WLAN AP 182 based on the UE's own measurements 208 or determinations without facilitating any further communication to the eNB 120, the collocated device 199, the WT 186 or other network device.

In another embodiment, the UE measurements 208 can also be communicated to the eNB 120 via the interface or link 150 (e.g., via RRC or other link). The UE 110 supporting LWA can be configured by the eNB 120 to perform WLAN measurements based on WLAN measurement data 208 to the UE 110. For example, the eNB 120 can configure the UE to perform measurements of WLAN AP networks or network device in response to, or based on a request (e.g., from the eNB 120 or other device), a predetermined period, an event-trigger, or some other criteria. WLAN measurements can be configured using WLAN AP identifiers (e.g., BSSID, HESSID or SSID), WLAN AP channel number or WLAN AP band as the data 208, for example.

WLAN measurement reporting can also be triggered using a received signal strength indication (RSSI), or other signal quality of a WLAN AP network of a WLAN AP as an event trigger, for example, in which upon satisfying a certain threshold the UE 110 can report measurement data 208 or make a determination to generate a WLAN mobility operation within the same WLAN mobility set 193. WLAN measurement report data 208 from the UE 110 to the eNB 120, or vice versa, can comprise RSSI, channel utilization, station count, admission capacity, backhaul rate, a WLAN identifier, one or more WLAN AP priorities, one or more WLAN authentication/security keys, or the like. WLAN measurements can be configured by the eNB 120, for example, to support LWA activation, WLAN mobility set mobility of different groups of WLAN APs controlled by different WTs (or WLAN AP mobility within a WLAN mobility set), or LWA deactivation, for example.

In another aspect, the LTE eNB 120 can configure the UE 110 to further perform WLAN mobility operations among groups of WLAN APs or WLAN mobility sets between different WTs as well based on the UE measurements or status reports 208. Groups of one or more WLAN APs can be configured or controlled to one WT per group, for example.

The eNB 120 can activate LWA aggregation by forwarding or moving one or more LWA bearers (or WT data 204) to another WT or group of WLAN APs (via the WT 186 or other WT) to enable LWA aggregation protocol processes without additional bearers or hand shaking for inter/intra WLAN mobility operations. The eNB 120 can also communicate configuration data or WLAN AP data 204 to the WT 186 (or another WT). The data 204 (e.g., a list or data related to one or more WLAN APs) can then enable the WT 186 to configure one or more WLAN APs, such as from a list of WLAN APs and other data that is received from the eNB 120. The data 204 from the eNB 120, for example, can include one or more WLAN AP IDs to a WT 186, one or more priorities with respect to the UE 110 (or UE preferences) for best case potential WLAN AP candidates for connection, or one or more WLAN AP authentication/security key(s), which can be shared as one key to the WLAN APs for integration with the target WT and the eNB, for example.

The data (e.g., WT data 204) for configuration can then be forwarded/distributed as WLAN data 206 in whole or partially for configuration between the WT 186 and the WLAN APs 180-182 as a connected WLAN mobility set 193. The WLAN mobility set 193 can thus be dynamically or statically configured based on the configuration of data 204 from the eNB 120 and data 206 to the WLAN APs 180-182, for example. Likewise, the UE 110 can also receive data 208 that is related to the newly configured WT and associated WLAN APs as a newly configured WLAN mobility set configuration, along with identifiers and one or more keys for access within the newly configured WLAN mobility set.

In addition or alternatively, in order to prevent packet loss, the eNB 120 can also re-send PDCU packet data units (PDUs) that have been sent to the previous WLAN AP 180 for delivery to the UE 110, but did not receive an acknowledgement or ACK (either using the GTP-U based status reporting from the WLAN AP 180 or PDCP based status reporting from the UE 110, for example). The eNB can thus buffer PDCP PDUs sent to the AP for delivery to the UE 110 until these have been acknowledges (at PDCP, GTP-U layer or otherwise).

Furthermore, the UE 110 could also notify the eNB 120 that it is performing the WLAN mobility operation 202, or communicate a suspend command, for example. As such, the suspend communication or command could trigger the eNB to suspend traffic to the WLAN AP 180 long enough for the WLAN mobility operation to be implemented by the UE, or thereafter a resume command/signal is communicated.

Figure 3:
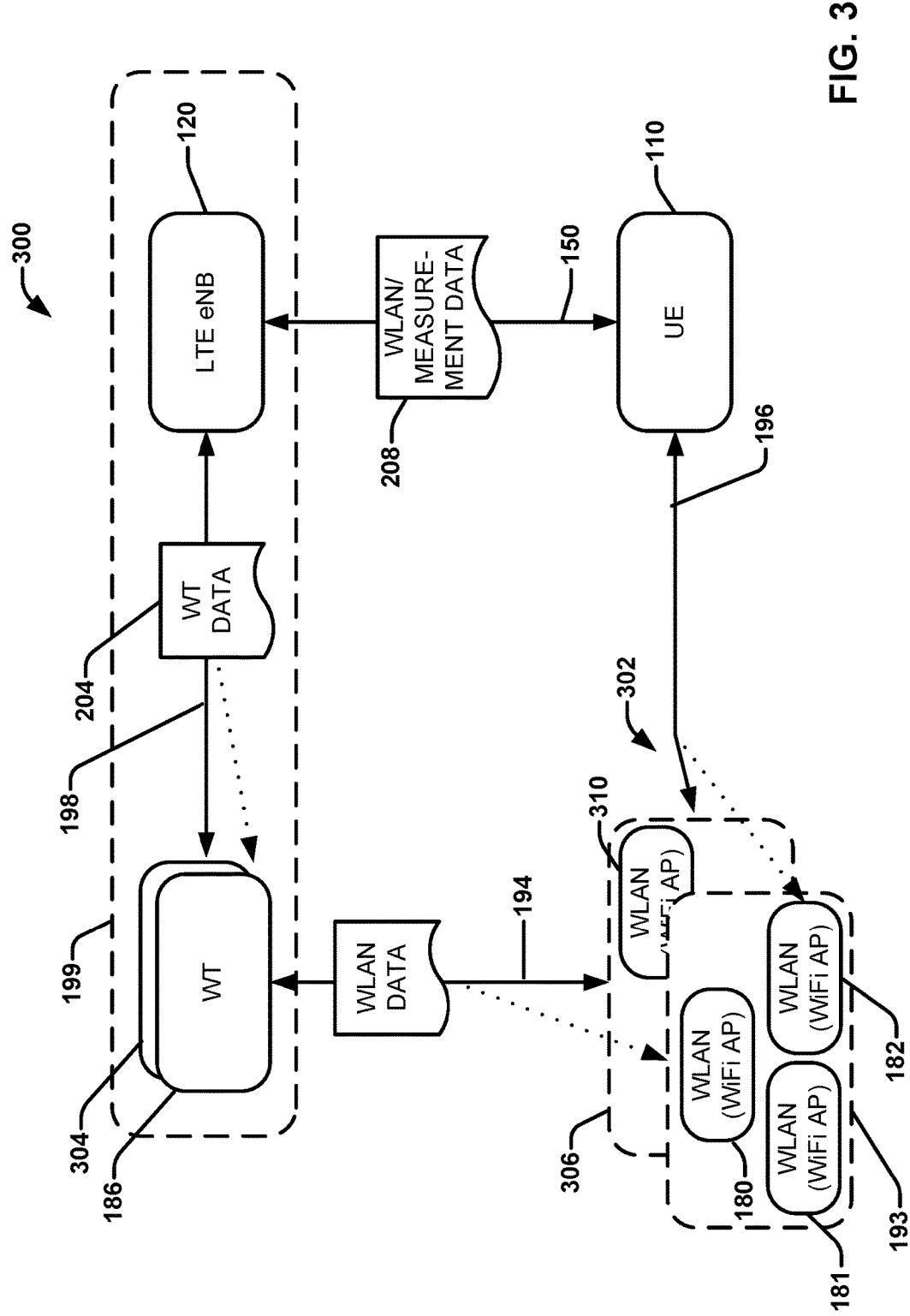
FIG. 3 illustrates another wireless communications network system for a UE or eNB to implement a WLAN mobility operation according to various aspects.

Referring to FIG. 3, illustrated is network environment 300 in accordance with further embodiments or aspects being described. The network 300 comprises similar components as described above with respect to FIG. 2. However, the network environment 300 further comprises a second WT 304 and a second WLAN mobility set 306 that are different from the first WT 186 and the first WLAN mobility set 193.

In one embodiment, the eNB 120 can initiate or prompt the UE 110 to perform a WLAN mobility operation 302 between WLAN APS of different WLAN mobility sets (e.g., 193 and 306), which can be based on UE measurement data to eNB 120 or independent of UE measurements data. In the case of FIG. 3, the network facilitates control via the eNB 120 of the WLAN mobility operations (e.g., WLAN AP switching with the UE 110 and WLAN APs). The eNB can activate LWA aggregation to a WT 304 by moving or communication one or more bearers (e.g., LWA bearers). The LWA aggregation activation can be based on UE measurement data 208 communicated to the eNB 120, for example. The configuration of the WLAN mobility set 305 can be facilitated or enabled by data 204 to the WT 304, as detailed above in FIG. 2 by the eNB 120.

The eNB 120 can continue to receive measurement data 208 by the UE 110, and based on the continued data 208, further initiate or prompt the UE 110 to switch from the WLAN AP 382 of the WLAN mobility set 193 to a different WLAN AP of the newly configured or different pre-configured WLAN mobility set 306 (e.g., to WLAN AP 310), which can comprise different identifiers, priorities, or WLAN authentication/security key(s) than the WLAN APs 180-182 of the other WLAN mobility set 193. The eNB 120 can initiate a WLAN mobility operation based on the UE measurements or its own data or measurements without UE measurements.

In an aspect, the eNB 120 can also provide the UE 110 with data 208 related to a WLAN mobility set 306. The data 208, for example, can identify or enable a connection between the UE 110 and any WLAN AP (e.g., 310) of the particular WLAN mobility set 306. The data 208 can comprise one or more WLAN AP identifiers, WLAN AP authentication/security keys, WLAN AP priorities, rankings, or other properties or parameters related to the WLAN APs (e.g., WLAN AP 310) of the WLAN mobility set 310. When the UE 110 is configured with data related to the WLAN mobility set 306, it can then be prompted to connect either by receiving the data related to the newly configured WLAN mobility set 306 or a separate indicator/signal. The UE 110 can attempt to connect to a WLAN AP whose identifiers match the ones of the configured mobility set, for example, in response an indication by the eNB 120 or the data 208 related to the newly configured WT 304 or WLAN mobility set 306. UE mobility to WLAN APs not belonging to the UE mobility set can thus be controlled, initiated or enabled by the eNB 120 (e.g. updating the WLAN mobility set based on measurement reports provided by the UE 110), while WLAN mobility operation within each WLAN mobility set can be controlled/determined by the UE 110 itself.

In one embodiment, when the eNB 120 decides to initiate WLAN mobility set mobility (e.g., between WLAN mobility set 193 and 306), it can first indicate to the target WT (e.g., 304) that it should expect the UE 110 to connect to one of its WLAN APs (e.g., via data 204 on the interface 198), and it can also send the security key to this target WT 304 to distribute to one or more target WLAN APs 310, which can be a part of the newly configured WLAN mobility set 306. This can be done, for example, using Xw AP signaling on the network.

In another aspect, the prompting by the eNB 120 can indicate to the UE 110, for example, WLAN mobility operations within the same WLAN mobility set can be prompted by the eNB 120 as well within a WLAN mobility.

The UE 110 can be connected to one WLAN mobility set at a time and opt to generate a WLAN mobility operation, which involves switching between WLAN APs of a WLAN mobility set without notice to the eNB, opt to select the WLAN AP within the particular set after configuration of a new WLAN mobility set, or be initially provided the WLAN AP (e.g., WLAN AP 310) to which it will connect at initially within the newly configured WLAN mobility set 306. After connection to a new WLAN mobility set 306, for example, the UE 110 can initiate/control on its own, independent of communication to the eNB 120, WLAN mobility operations 302 with WLAN APs within the WLAN mobility set 306.

The WLAN APs (e.g., 310 or additional APs) belonging to the WLAN mobility set 306 can share a common WLAN Termination (WT) 304, which can operate to terminate an Xw interface in the control plane or the user plane (e.g., an Xw-C and Xw-U). The termination endpoints for Xw-C and Xw-U can differ. The WLAN identifiers belonging to a mobility set 306 can also be a subset of all WLAN identifiers associated to the WT 304.

Figure 4:
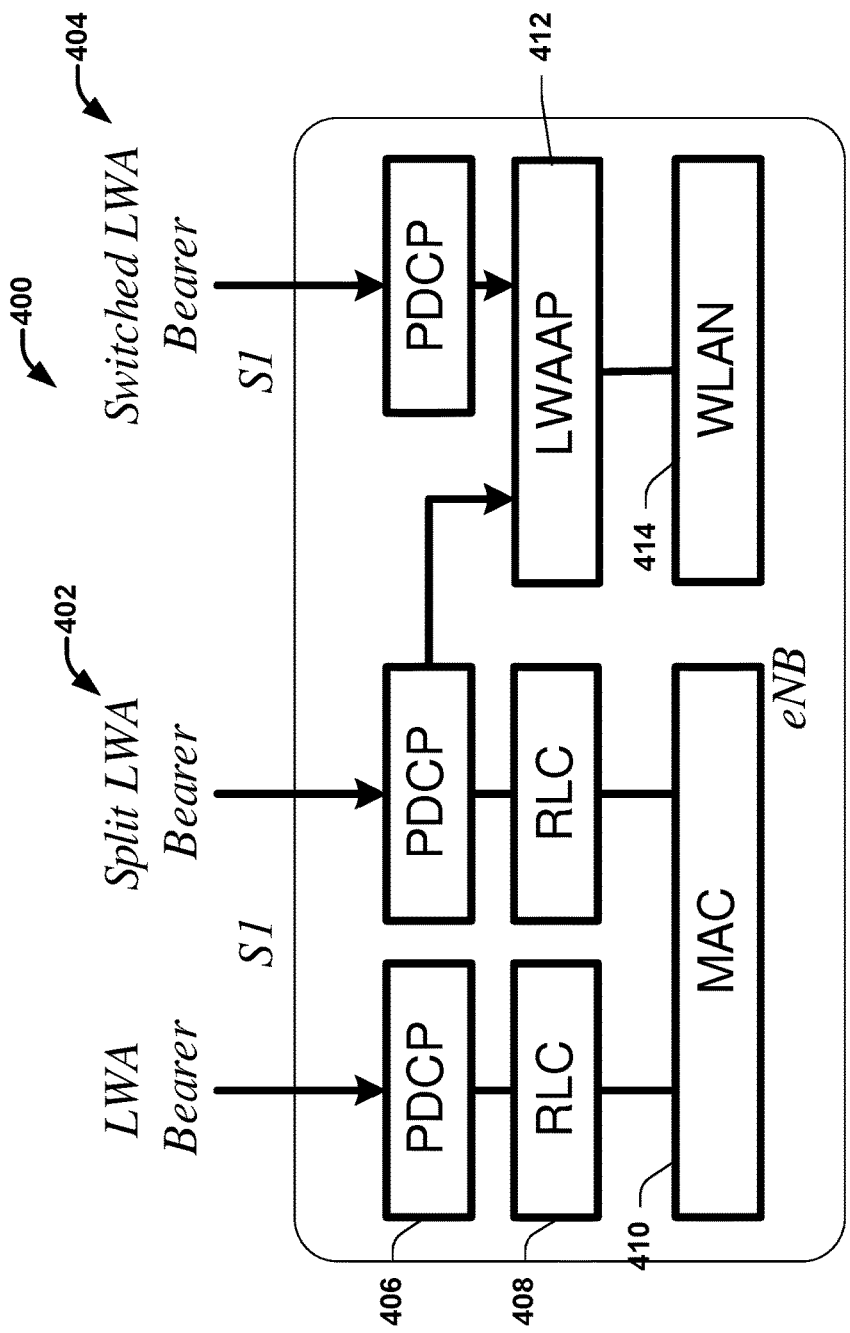
FIG. 4 illustrates a collocated protocol aggregation architecture applicable to the network environments, devices and processes according to various aspects or embodiments being disclosed.
Figure 5:
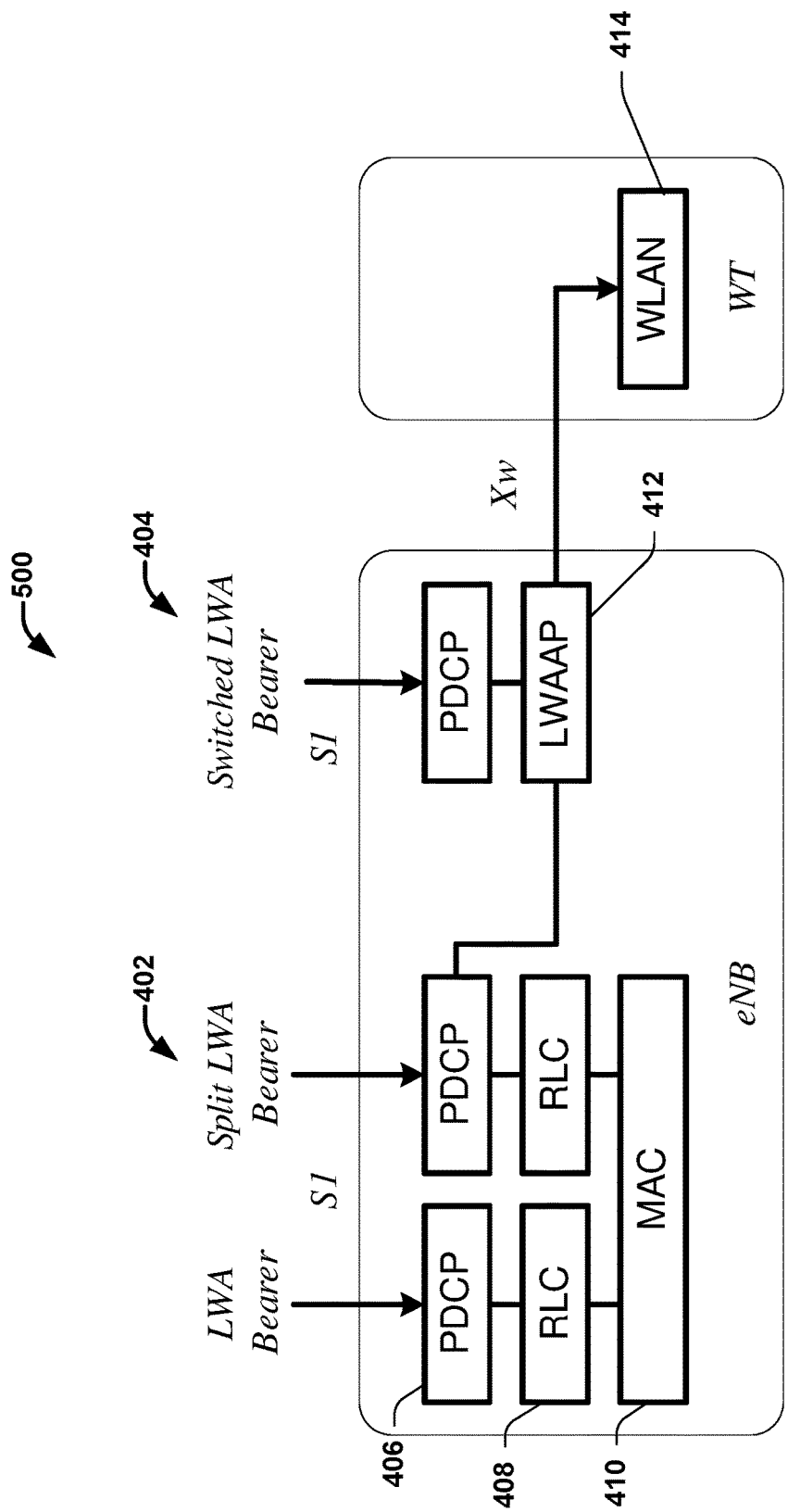
FIG. 5 illustrates a non-collocated protocol aggregation architecture applicable to the network environments, devices and processes according to various aspects or embodiments being disclosed.

FIGS. 4 and 5 illustrate LWA protocol aggregations in collated architecture of FIG. 4 and non-collated architecture of FIG. 5. In the 3GPP terminology, a bearer can represent a class of traffic having a set of network parameters that establish a specific standard treatment for the traffic or data being communicated on the particular class of traffic (e.g., voice or the like) for one or more UEs or network devices (e.g., eNBs or the like). Bearers can also carry user plane traffic (i.e., user data) on an air interface. Different link aggregation architectures can be utilized with embodiments herein for operating a 3GPP LWA bearer, for example, to different communication links (e.g., WLAN, eNB or other communication links associated with different RATs).

In LWA, the radio protocol architecture that a particular bearer uses depends how the bearer is set up. Two bearer types can exist for LWA: split LWA bearer 402 and switched LWA bearer 404. Those two bearer types are depicted on FIG. 4 for the collocated scenario and on FIG. 5 for the non-collocated scenario.

For PDUs sent over WLAN in LWA operation, the LWAAP entity 412 can generate LWA PDUs containing a data radio bearer (DRB) identity and the WT can forward data to the UE 110 over the WLAN layer 414. The UE 110 can use the data to determine that the received PDU belongs to an LWA bearer and can use the DRB identity to determine to which LWA bearer the PDU belongs to.

In the downlink, LWA supports split bearer operation where the PDCP sublayer of the UE supports in-sequence delivery of upper layer PDUs based on the reordering procedure introduced for DC. In the uplink, PDCP PDUs can only be sent via the LTE. The UE supporting LWA may be configured by the eNB to send PDCP status report or LWA PDCP status report, in cases where feedback from WT is not available, for example.

The Packet Data Convergence Protocol (PDCP) layer 406 can be one of the layers of the Radio Traffic Stack in LTE, UMTS and performs IP header compression and decompression, transfer of user data and maintenance of sequence numbers for Radio Bearers which are configured for lossless serving radio network subsystem (SRNS) relocation, for example.

The radio link control (RLC) layer 408, for example, can handle an automatic repeat request fragmentation protocol used over a wireless air interface. The RLC can detect packet losses and performs retransmissions to bring packet loss down to a low percentage rate, which is suitable for TCP/IP applications.

The physical (PHY) and MAC layers 410 and 414, corresponding to separate RATs (e.g., LTE and WLAN) respectively, can operate to provide an electrical, mechanical, and procedural interface to the transmission medium. The physical layer translates logical communications requests from the data link layer into hardware-specific operations to affect transmission or reception of electronic signals. The MAC sublayer provides addressing and channel access control mechanisms that make it possible for several terminals or network nodes to communicate within a multiple access network that incorporates a shared medium.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
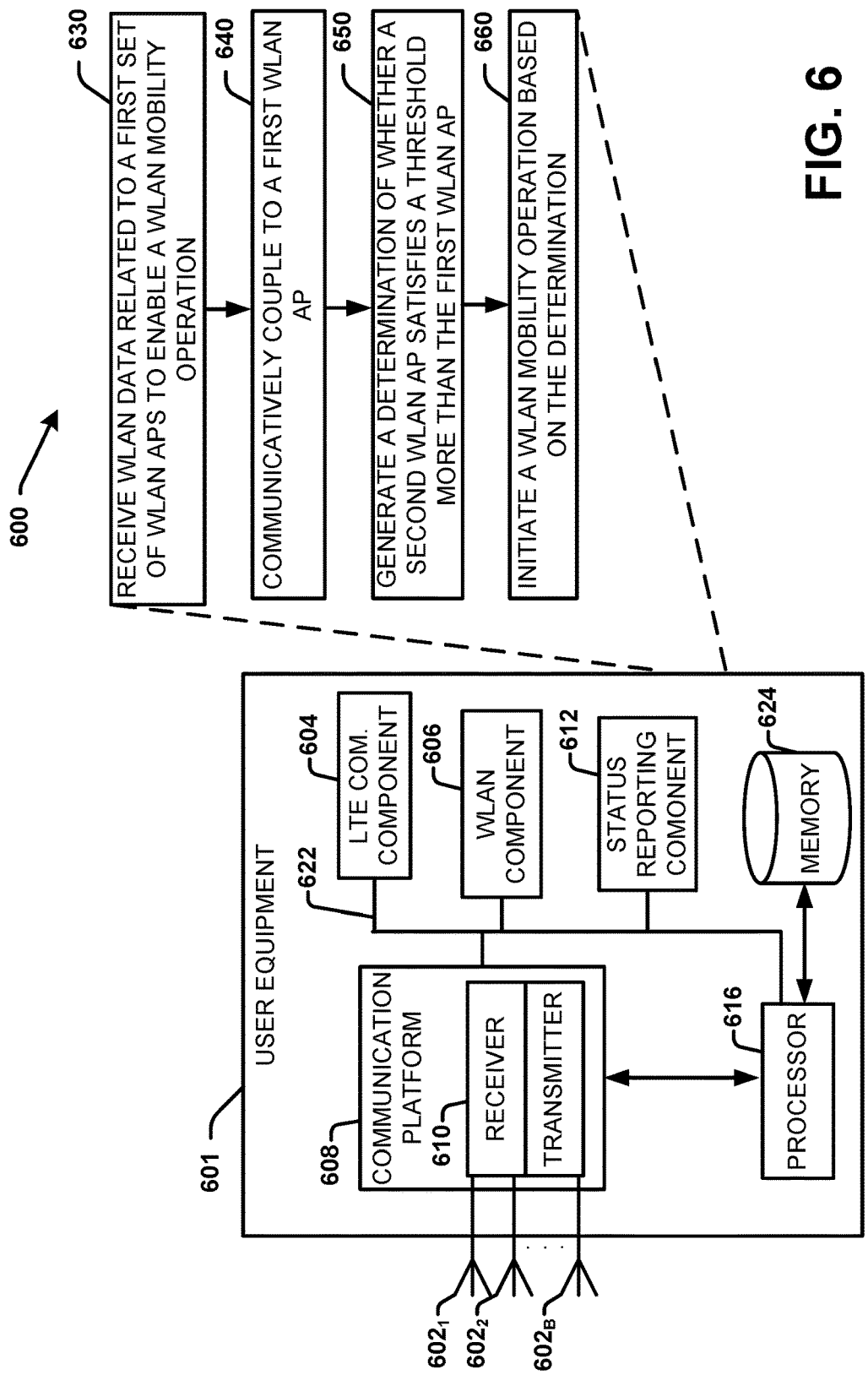
FIG. 6 illustrates an example UE with component(s) for facilitating a method according to various aspects.

FIG. 6 illustrates with reference to the figures above a process flow with a UE 601 for initiating mobility WLAN operations in accordance with various aspects being disclosed. The UE can receive and transmit signal(s) from and to wireless devices, wireless ports, wireless routers, etc. through segments $602_1$-$602_B$ (B is a positive integer). Segments $602_1$-$602_B$ can be internal and/or external to access equipment and/or software related to access of a network. The communication platform 608, which can include electronic components and associated circuitry that provide for processing and manipulation of received signal(s) and other signal(s) to be transmitted.

In an aspect, communication platform 608 can include a receiver/transmitter 610 that can convert analog signals to digital signals upon reception of the analog signals, and can convert digital signals to analog signals upon transmission. In addition, receiver/transmitter 610 can divide a single data stream into multiple, parallel data streams, or perform the reciprocal operation. Coupled to receiver/transmitter 610 can be any number of other components for signal processing or receiving/transmitting communications.

Access equipment, user equipment and/or software related to access of a network can also include a processor 616 configured to confer, at least in part, functionality to substantially any component in access equipment, circuitry or software. In particular, processor 616 can facilitate configuration of access equipment or software through one or more components therein.

Processor 616 can be functionally connected to communication platform 608 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 616 can be functionally connected, through data, system, or an address bus 622 to confer, at least in part, functionality to each of such components connected thereto.

In access equipment or software, memory 624 can retain location and/or coverage area (e.g., macro sector, identifier(s)) access list(s) that authorize access to wireless coverage through access equipment, network devices and/or software sector intelligence that can include ranking of coverage areas in the wireless environment of access equipment or software, radio link quality and strength associated therewith, or the like. Memory 624 also can store data structures, code instructions and program modules, system or device information, code sequences for scrambling, spreading and pilot transmission, access point configuration, and so on. Processor 616 can be coupled (e.g., through a memory bus), to memory 624 in order to store and retrieve information used to operate and/or confer functionality to the components, platform, and interface that reside within access equipment and/or software.

UE 601 further includes various components such as an LTE component 604, a WLAN component 606, and a status reporting component 612. The memory 624 can store executable instructions that execute one or more of the components, while the processor 616 configured to execute the executable instructions for the one or more executable components.

The LTE communication component 604 can operate (e.g., at act 630 of process flow 600) to receive WLAN data (e.g., data 208) related to a first set of WLAN APs 193 that enables a WLAN mobility operation among the first set of WLAN APs (e.g., the WLAN mobility set 193). The set of WLAN data 208 can comprise one or more WLAN identifiers identifying one or more WLAN APs of the first set of WLAN APs 193 that support a LTE/WLAN Aggregation protocol. Where the network is preconfigured, not all WLAN APs of the first set of WLAN APs may support LWA, or all could support LWA, for example. The set of WLAN data can also include one or more WLAN AP priorities of the WLAN APs part of the first set (or coupled to a first WT), or also include one or more WLAN authentication/security keys of the first set of WLAN APs that enable access to any one in particular and to the WT (e.g., 186) as well via the connected WLAN AP.

The LTE communication component 604 can communicatively couple to an eNB (e.g., 120) via an LTE link (e.g., link 150 or other channel) during the WLAN mobility operation while switching from being communicatively coupled to the first WLAN AP (e.g., WLAN AP 180) to being communicatively coupled to the second WLAN AP (e.g., WLAN AP 182), via a WT (e.g., WT 186). In one example, the LTE communication component 604 is further configured to notify the eNB 120 of the WLAN mobility operation (e.g., 202) from the first WLAN AP 180 to the second WLAN AP 182 via a radio resource control (RRC) connection, after a successful connection to the second WLAN AP 182. The LTE communication component 604 can also communicate a suspend command to the eNB 120 to stop traffic via a first WiFi network of the first WLAN AP 180 and communicate a resume command to the eNB 120 to resume traffic via a second WiFi network of the second WLAN AP 183, such as after a successful WLAN mobility operation.

The WLAN component 606 (e.g., at act 640 of the process flow 600) can communicatively couple to a first WLAN AP of the first set of WLAN APs 193. At 650 of the process flow 600, the WLAN component 606 can further generate a determination of whether a second WLAN AP 183 satisfies a communication threshold (e.g., RSSI threshold or other network parameter or signal property threshold) more than the first WLAN AP 180, and, in response to the determination. At 660 of the process flow 660, the WLAN component 606 can then initiate the WLAN mobility operation to switch from being communicatively coupled to the first WLAN AP 180 to being communicatively coupled (e.g., via a WLAN link 196) to the second WLAN AP 183 by utilizing the set of WLAN data 208.

The status reporting component 612 can operate to report WLAN measurements of one or more WLAN APs of the first set of WLAN APs 193 to the eNB 120, which is communicatively coupled to the first set of WLAN APs via the WT 186. The status reporting component 612 can further report WLAN measurements of a second set of WLAN APs (e.g., WLAN mobility set 306) supporting LTE/WLAN Aggregation with a different set of WLAN data 208 (e.g., measurement configuration data, identifiers, security keys or the like) than the set of WLAN data related to the first set of WLAN APs 193.

Figure 7:
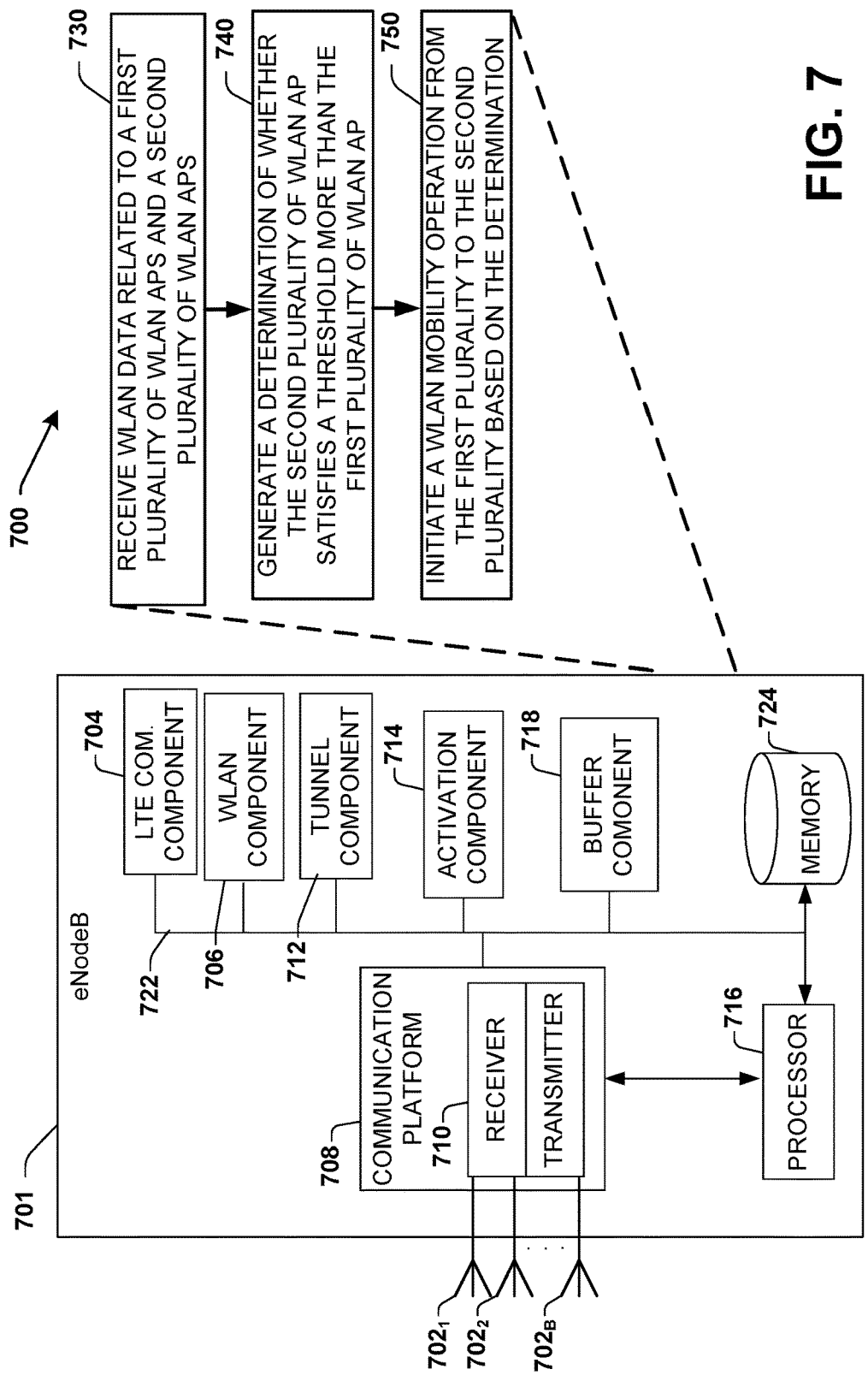
FIG. 7 illustrates an example access equipment or eNB with component(s) for facilitating a method according to various aspects.

FIG. 7 illustrates with reference to the figures above a process flow 700 with an example of an eNB 701 comprising at least some components similar to the UE of FIG. 6 for facilitating WLAN mobility operations of a network environment. For example, the eNB 701 can receive and transmit signal(s) from and to wireless devices, wireless ports, wireless routers, etc. through segments $702_1$-$702_B$ (B is a positive integer), similar to the segments $602_1$-$602_B$ of FIG. 6. The communication platform 708, which can include electronic components and associated circuitry that provide for processing and manipulation of received signal(s) and other signal(s) to be transmitted, as well as include a receiver/transmitter 710

Processor 716 can be functionally connected to communication platform 708 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 716 can be functionally connected, through data, system, or an address bus 722 to confer, at least in part, functionality to each of such components connected thereto. Memory 724 also can store data structures, code instructions and program modules, system or device information, code sequences for scrambling, spreading and pilot transmission, access point configuration, and so on. Processor 716 can be coupled (e.g., through a memory bus), to memory 724 in order to store and retrieve information used to operate and/or confer functionality to the components, platform, and interface that reside within access equipment and/or software.

The eNB 701 can further comprise an LTE communication component 704, a WLAN component 706, a tunnel component 714 and a buffer component 718. The LTE communication component 704 that receives (e.g., at act 730 of process flow 700) a first set of WLAN measurement data (e.g., 208) related to a first plurality of WLAN APs (e.g., the WLAN mobility set 193) or the WT 186 and a second set of WLAN measurement data related to a second plurality of WLAN APs (e.g., the WLAN mobility set 306) or the WT 304. The LTE component 704 can configure measurements to be communicated from the UE device (e.g., 600) of the first plurality of WLAN APs and of the second plurality of WLAN APs based on at least one of a request, a period, or an event trigger comprising a predetermined threshold, via an radio resource channel (RRC), for example.

The WLAN component 706 can generate (e.g., at act 740 of process flow 700) a determination of whether the second plurality of WLAN APs 306 satisfies a threshold (e.g., a mobility parameter of the UE (e.g., 601), a signal strength, RSSI, or other network parameter for determining mobility of the UE from a first plurality of WLAN APs (or WT 186) to a second plurality of WLAN APs (or WT 304) based on the first set of WLAN measurement data and the second set of WLAN measurement data. If the second plurality of WLAN APs or the second WT 304 is more optimal or better satisfies the threshold than the first WLAN APs or the first WT 186 with respect to a user equipment (UE) device based on the first set of WLAN measurement data and the second set of WLAN measurement data the eNB could determine to configure or facilitate handover or switching the UE connection from the first to the second WLAN APs/WT. The eNB then, in response to the determination, can initiate (e.g., at act 750 of the process flow 700) a WLAN mobility operation to switch from being communicatively coupled to the first plurality of WLAN APs to being communicatively coupled to the second plurality of WLAN APs. The UE (e.g., 601) can then independently operate WLAN mobility according to its own measurement from within the newly configured WLAN APs (e.g., WLAN AP 310) via the newly configured WT 306.

In one example, the WLAN component 706 can communicate, in response to the determination, WLAN identifiers of WLAN APs associated with the second plurality of WLAN APs that support LTE/WLAN aggregation and enable the UE device (e.g., 600) to select a WLAN AP from the second plurality of WLAN APs to connect with based on this data. The WLAN component 706 can communicate data 206 to a WLAN Termination logical node (e.g., a WLAN logic node or WT 304), in response to the determination, data at least one WLAN identifier of WLAN APs associated with the second plurality of WLAN APs that support LTE/WLAN aggregation and WLAN authentication/security keys associated with the second plurality of WLAN APs to enable the UE device to select a WLAN AP from the second plurality of WLAN APs to connect with.

In another embodiment, the activation component 714 can operate to activate LTE/WLAN Aggregation by moving at least one bearer to a WLAN network devices such as to the WT 304 or one or more WLAN APs coupled thereto in order to enable communications in LTE and the WLAN simultaneously or concurrently for any of the network devices (e.g., WT or WLAN APs associated with the WT).

The buffer component 718 can buffer in the memory downlink WLAN PDUs in response to initiating the WLAN mobility operation between the first plurality of WLAN APs and the second plurality of WLAN APs. As such, communications can be suspended (e.g., by a suspend signal or command) at either the UE's request for WLAN mobility within a WLAN mobility set, or the eNB initiating a WLAN mobility between groups of WLAN APs associated with different WTs, for example.

The tunnel component 712 can further switch a general packet radio service tunneling protocol user plane (GTP-U) tunnel from a first WLAN Termination logical node associated with the first plurality of WLAN APs to a second WLAN Termination logical node associated with the second plurality of WLAN APs in response to a notification of the WLAN mobility operation from the UE device.

Figure 8:
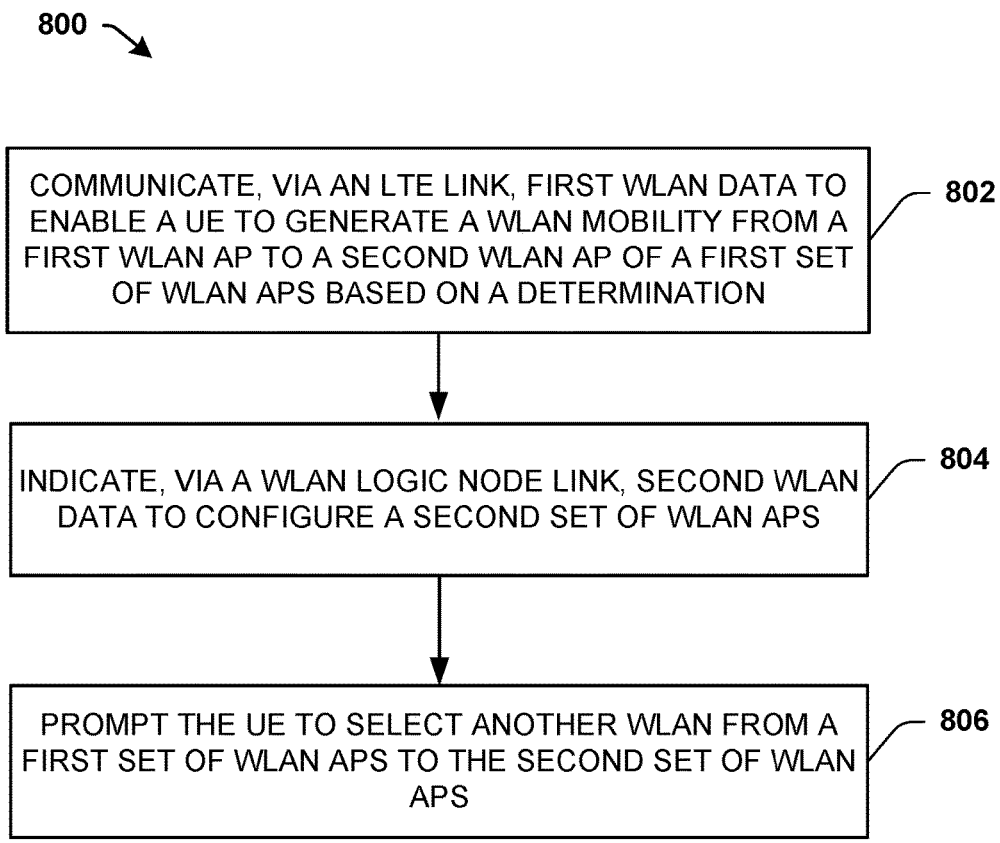
FIG. 8 illustrates a process flow for WLAN mobility according to various aspects.

FIG. 8 illustrates another process flow 800 for a system of an eNB comprising one or more processors to perform operations in a heterogeneous network of a radio access network (RAN) for WLAN mobility in LTE/WLAN aggregation. At 802, the method initiates with communicating, via an LTE link, a first set of WLAN data related to a first set of WLAN APs that enables a UE device to generate a WLAN mobility from a first WLAN AP to a second WLAN AP of the first set of WLAN APs based on a determination by the UE device. The first set of WLAN data can comprise a WLAN identifier identifying the second WLAN AP of the first set of WLAN APs.

In one embodiment, the UE measurement data as data 208 can be communicated to the eNB 120 via the interface or link 150 (e.g., via RRC or other link). The UE 110 supporting LWA can be configured by the eNB 120 with 208 (e.g., WLAN/measurement configuration data 208) to perform WLAN measurements of WLAN APs individually or of certain groups (WLAN mobility sets within range). For example, the eNB 120 can configure the UE to perform measurements of WLAN AP networks or network device in response to, or based on a request (e.g., from the eNB 120 or other device), a predetermined period, an event-trigger, or some other criteria. WLAN measurements can be configured using WLAN AP identifiers (e.g., BSSID, HESSID or SSID), WLAN AP channel number or WLAN AP band as the data 208, for example. WLAN measurement reporting by the UE (e.g., 600 or 110) can also be triggered using a received signal strength indication (RSSI), or other signal quality of a WLAN AP network of a WLAN AP as an event trigger, for example, in which upon satisfying a certain threshold the UE 110 can report measurement data 208 or make a determination to generate a WLAN mobility operation within the same WLAN mobility set 193. WLAN measurement report data 208 from the UE 110 to the eNB 120, or from the eNB 120 to the UE 110, can comprise RSSI, channel utilization, station count, admission capacity, backhaul rate, a WLAN identifier, one or more WLAN AP priorities, one or more WLAN authentication/security keys, or the like. WLAN measurements can be configured by the eNB 120, for example, to support LWA activation, WLAN mobility set mobility of different groups of WLAN APs controlled by different WTs (or WLAN AP mobility within a WLAN mobility set), or LWA deactivation, for example.

At 804, the method comprises indicating, via a WLAN Termination logical node link, a second set of WLAN data that enables a WLAN Termination logical node to configure a second set of WLAN APs for a WLAN connection with the UE device. The second set of WLAN data can comprise a plurality of WLAN identifiers associated with WLAN APs of the second set of WLAN APs and one or more WLAN authentication/security keys associated with the second set of WLAN APs. For example, the eNB 120 can activate LWA aggregation by forwarding or moving one or more LWA bearers (or WT data 204) to another WT or group of WLAN APs (via the WT 186 or other WT) to enable LWA aggregation protocol processes without additional bearers for WLAN mobility operations. The eNB 120 can also communicate configuration data or WLAN AP data 204 to the WT 186 (or another WT). The data 204 (e.g., a list or data related to one or more WLAN APs) can then enable the WT 186 to configure one or more WLAN APs, such as from a list of WLAN APs and other data that is received from the eNB 120. The data 204 from the eNB 120, for example, can include one or more WLAN AP IDs to a WT 186, one or more priorities with respect to the UE 110 (or UE preferences) for best case potential WLAN AP candidates for connection, or one or more WLAN AP authentication/security key(s), which can be shared as one key to the WLAN APs for integration with the target WT and the eNB, for example.

At 806, the method comprises prompting, via the long term evolution link, the UE device to select another WLAN mobility from the second WLAN AP of the first set of WLAN APs to another WLAN AP of the second set of WLAN APs. Here, the eNB 120 can decide to hand over the UE to a new WLAN mobility set (e.g., a second WLAN mobility set for a WLAN mobility set mobility operation. Once the eNB 120 configures WiFi measurements to the UE 110, activates aggregation, the eNB 120 continues to receive measurements or reports from the UE 110 and when measurement values are different or a predetermined threshold of signal quality or factors is satisfied, for example, the eNB can prompt the UE 110 to perform WLAN mobility between WLAN mobility sets.

When the eNB 120 decides to initiate WLAN mobility set mobility (e.g., between WLAN mobility set 193 and 306), it can first indicate to the target WT (e.g., 304) that it should expect the UE 110 to connect to one of its WLAN APs (e.g., via data 204 on the interface 198), and it can also send the security key to this target WT 304 to distribute to one or more target WLAN APs 310, which can be a part of the newly configured WLAN mobility set 306. This can be done, for example, using Xw AP signaling on the network. The eNB 120 can thus trigger the WT 304 (e.g., as a WLAN Termination logical node) to distribute one or more authentication/security keys to the second set of WLAN APs to enable the second set of WLAN APs to connect with the WLAN Termination logical node and the UE 110 to select a WLAN AP from the second set of WLAN APs for addition WLAN mobility operations initiated independently by the UE 110.

Figure 9:
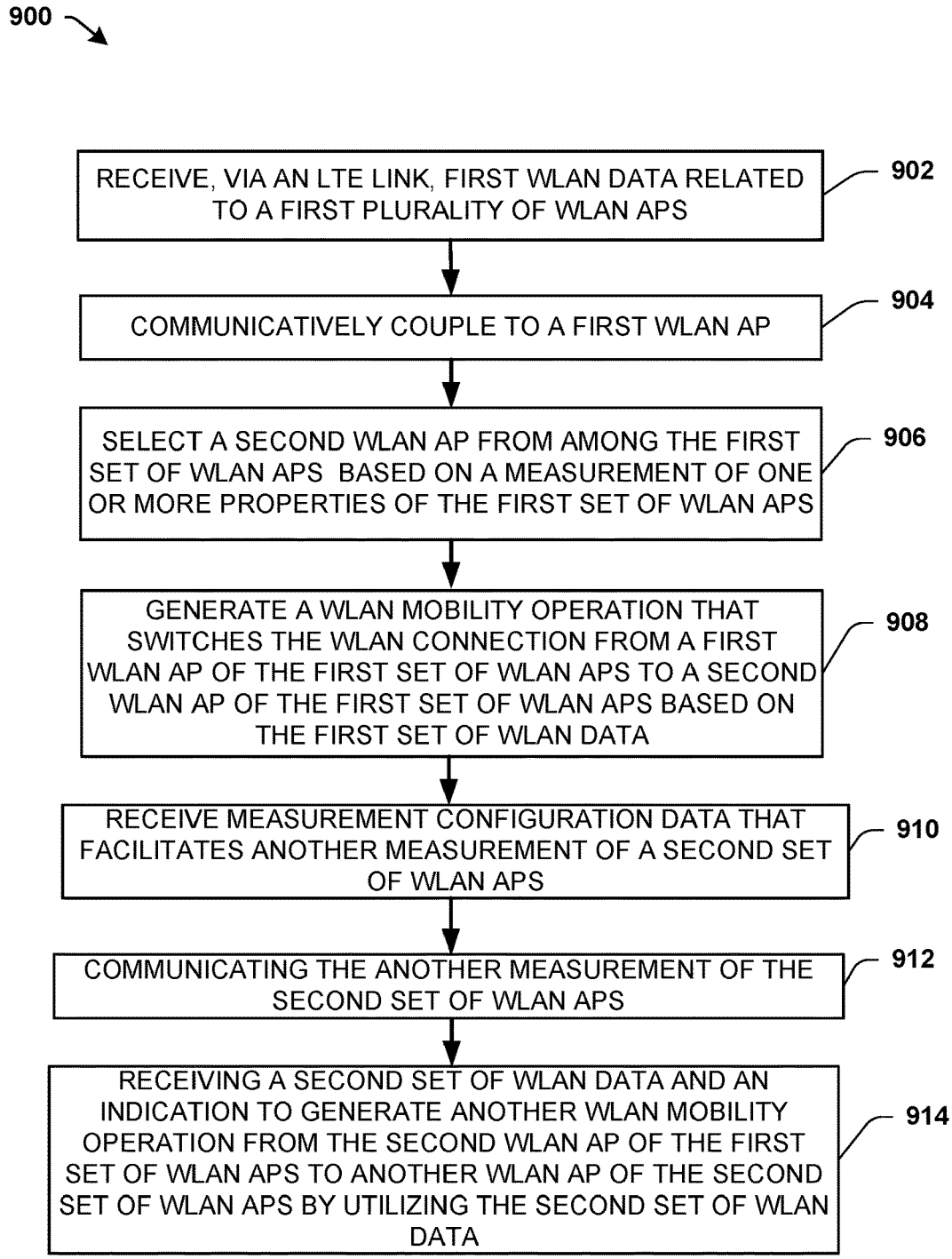
FIG. 9 illustrates another process flow for WLAN mobility according to various aspects.

Referring to FIG. 9, illustrated is another process flow 900 of a system for a UE comprising one or more processors to perform operations in a heterogeneous network of a RAN for WLAN mobility in LTE/WLAN aggregation.

The method 900 initiates at 902 with receiving, via a LTE link (e.g., 150), a first set of WLAN data related to a first set of WLAN APs (e.g., 193).

At 904, the method 900 comprises communicatively coupling, via a WLAN connection, to a first WLAN AP (e.g., 180).

At 906, the method 900 comprises selecting a second WLAN AP (e.g., 182) from among the first set of WLAN APs based on a measurement of one or more properties of the first set of WLAN APs.

At 908, a WLAN mobility operation 202 is generated that switches the WLAN connection (e.g., 196) from a first WLAN AP of the first set of WLAN APs to a second WLAN AP of the first set of WLAN APs based on the first set of WLAN data.

At 910, the UE 110 can receive measurement configuration data (e.g., 208) that facilitates an additional measurement of a second set of WLAN APs.

At 912, the additional measurement of the second set of WLAN APs is communicated to the eNB 120.

At 914, the method 900 includes receiving a second set of WLAN data and an indication to generate another WLAN mobility operation from the second WLAN AP of the first set of WLAN APs to another WLAN AP of the second set of WLAN APs by utilizing the second set of WLAN data.

In other embodiments, the method 900 can also include communicating to an eNB a suspend command before the WLAN mobility operation or before the another WLAN mobility operation. After the WLAN mobility operation or the additional WLAN mobility operation, the UE can further communicate a resume command in order to continue receiving data via the WLAN AP at the second WLAN mobility set (second setoff WLAN APs coupled to WT 304).

As used herein, the term "circuitry" may refer to, be part of, or include an Application Specific Integrated Circuit (ASIC), an electronic circuit, a processor (shared, dedicated, or group), and/or memory) shared, dedicated, or group (that execute one or more software or firmware programs, a combinational logic circuit, and/or other suitable hardware components e the that provide described functionality. In some embodiments, the circuitry may be implemented in, or functions associated with the circuitry may be implemented by, one or more software or firmware modules. In some embodiments, circuitry may include logic, at least partially operable in hardware.

Figure 10:
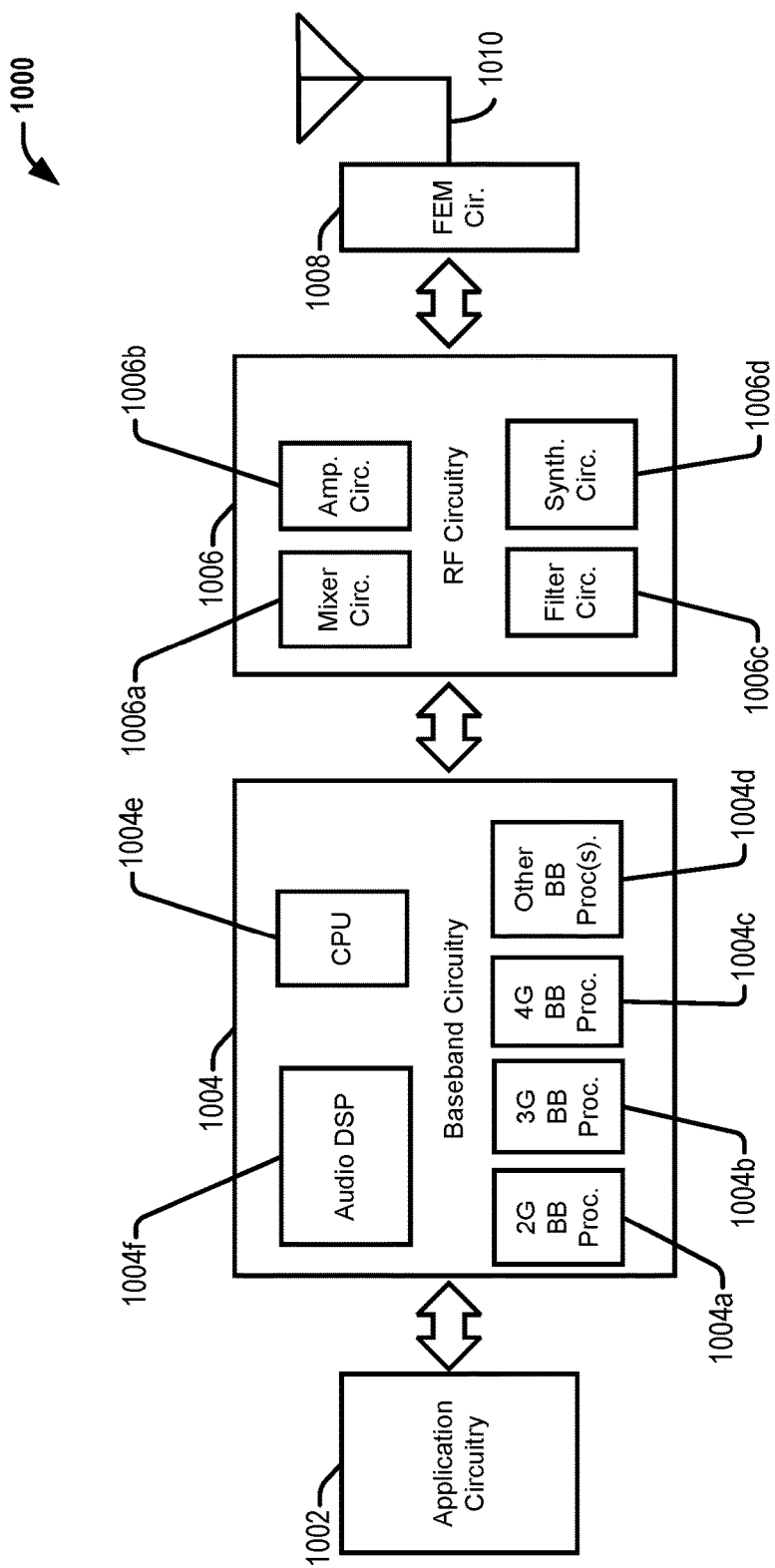
FIG. 10 is a block diagram illustrating an example UE or eNB useable in connection with various aspects described herein.

Embodiments described herein may be implemented into a system using any suitably configured hardware and/or software. FIG. 10 illustrates, for one embodiment, example components of network device such as a based station, eNB, or a User Equipment (UE) device 1000. In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors) e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband receive signal path of the RF circuitry signals received from a r1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/ion demodulate, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) and/or other wireless metropolitan area networks (WMAN), a wireless local area network (WLAN), a wireless personal area network) WPAN. (Embodiments in which the baseband circuitry 1004 is configured to support radio communications of more than one wireless protocol may be referred to multi as-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency)

and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the UE device 1000 may include additional elements such as, for example, memory/storage, display, camera, sensor, and/or input/output (I/O) interface.

Figure 11:
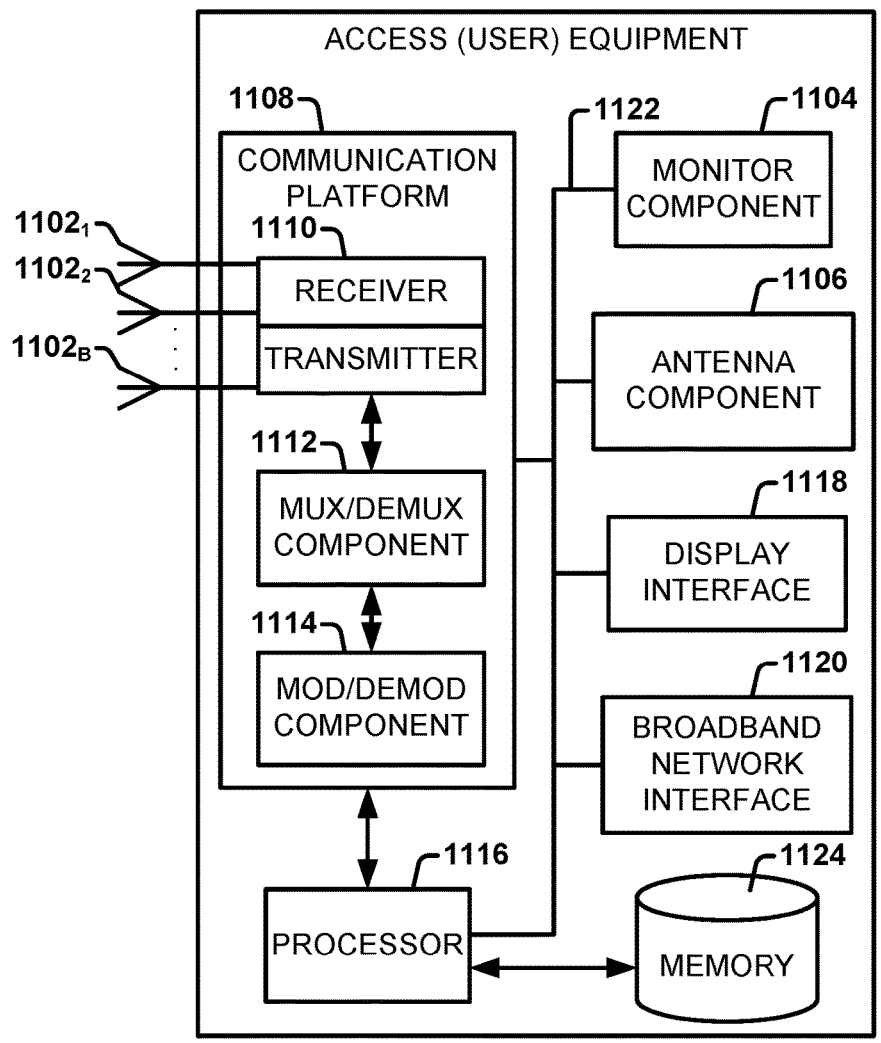
FIG. 11 is a block diagram of another example of UE, eNB, or other network device that facilitates bearer splitting according to various aspects described herein.

To provide further context for various aspects of the disclosed subject matter, FIG. 11 illustrates a block diagram of an embodiment of access (or user) equipment related to access of a network (e.g., network device, base station, wireless access point, femtocell access point, and so forth) that can enable and/or exploit features or aspects disclosed herein.

Access equipment (e.g., eNB, network entity, or the like), UE or software related to access of a network can receive and transmit signal(s) from and to wireless devices, wireless ports, wireless routers, etc. through segments $1102_1$-$1102_B$ (B is a positive integer). Segments $1102_1$-$1102_B$ can be internal and/or external to access equipment and/or software related to access of a network, and can be controlled by a monitor component 1104 and an antenna component 1106. Monitor component 1104 and antenna component 1106 can couple to communication platform 1108, which can include electronic components and associated circuitry that provide for processing and manipulation of received signal(s) and other signal(s) to be transmitted.

In an aspect, communication platform 1108 includes a receiver/transmitter 1110 that can convert analog signals to digital signals upon reception of the analog signals, and can convert digital signals to analog signals upon transmission. In addition, receiver/transmitter 1110 can divide a single data stream into multiple, parallel data streams, or perform the reciprocal operation. Coupled to receiver/transmitter 1110 can be a multiplexer/demultiplexer 1112 that can facilitate manipulation of signals in time and frequency space. Multiplexer/demultiplexer 1112 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1112 can scramble and spread information (e.g., codes, according to substantially any code known in the art, such as Hadamard-Walsh codes, Baker codes, Kasami codes, polyphase codes, and so forth).

A modulator/demodulator 1114 is also a part of communication platform 1108, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1116 configured to confer, at least in part, functionality to substantially any electronic component in access equipment and/or software. In particular, processor 1116 can facilitate configuration of access equipment and/or software through, for example, monitor component 1104, antenna component 1106, and one or more components therein. Additionally, access equipment and/or software can include display interface 1118, which can display functions that control functionality of access equipment and/or software or reveal operation conditions thereof. In addition, display interface 1118 can include a screen to convey information to an end user. In an aspect, display interface 1118 can be a liquid crystal display, a plasma panel, a monolithic thin-film based electrochromic display, and so on. Moreover, display interface 1118 can include a component (e.g., speaker) that facilitates communication of aural indicia, which can also be employed in connection with messages that convey operational instructions to an end user. Display interface 1118 can also facilitate data entry (e.g., through a linked keypad or through touch gestures), which can cause access equipment and/or software to receive external commands (e.g., restart operation).

Broadband network interface 1120 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1120 can be internal or external to access equipment and/or software and can utilize display interface 1118 for end-user interaction and status information delivery.

Processor 1116 can be functionally connected to communication platform 1108 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1116 can be functionally connected, through data, system, or an address bus 1122, to display interface 1118 and broadband network interface 1120, to confer, at least in part, functionality to each of such components.

In access equipment and/or software memory 1124 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1124 also can store data structures, code instructions and program modules, system or device information, code sequences for scrambling, spreading and pilot transmission, access point configuration, and so on. Processor 1116 can be coupled (e.g., through a memory bus), to memory 1124 in order to store and retrieve information used to operate and/or confer functionality to the components, platform, and interface that reside within access equipment and/or software.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system for a user equipment (UE) device, coupled to a heterogeneous network of a radio access network (RAN), comprising: a memory storing executable instructions that execute one or more computer executable components; and a processor configured to execute the executable instructions for the one or more executable components. The components comprising: a long term evolution (LTE) communication component configured to receive a set of wireless local area network (WLAN) data related to a first set of WLAN access points (APs) that enables a WLAN mobility operation among the first set of WLAN APs; and a WLAN component configured to communicatively couple to a first WLAN AP of the first set of WLAN APs, generate a determination of whether a second WLAN AP satisfies a communication criteria more than the first WLAN AP, and, in response to the determination, initiate the WLAN mobility operation to switch from being communicatively coupled to the first WLAN AP to being communicatively coupled to the second WLAN AP by utilizing the set of WLAN data.

Example 2 includes the subject matter of Example 1, wherein the set of WLAN data comprises WLAN identifiers identifying one or more WLAN APs of the first set of WLAN APs that support a LTE/WLAN aggregation protocol.

Example 3 includes the subject matter of any one of Examples 1-2, including or omitting optional elements, wherein the set of WLAN data further comprises one or more WLAN AP priorities of the first set of WLAN APs or one or more WLAN authentication/security keys of the first set of WLAN APs.

Example 4 includes the subject matter of any one of Examples 1-3, including or omitting optional elements, wherein the LTE communication component is further configured to communicatively couple to an eNB during the WLAN mobility operation while switching from being communicatively coupled to the first WLAN AP to being communicatively coupled to the second WLAN AP, via a WLAN Termination (WT).

Example 5 includes the subject matter of any one of Examples 1-4, including or omitting optional elements, wherein the LTE communication component is further configured to notify the eNB of the WLAN mobility operation from the first WLAN AP to the second WLAN AP via a radio resource control (RRC) connection, after a successful connection to the second WLAN AP.

Example 6 includes the subject matter of any one of Examples 1-5, including or omitting optional elements, wherein the LTE communication component is further configured to communicate a suspend command to an eNB to stop traffic via a first WiFi network of the first WLAN AP and communicate resume command to the eNB to resume traffic via a second WiFi network of the second WLAN AP.

Example 7 includes the subject matter of any one of Examples 1-6, including or omitting optional elements, further comprising: a status reporting component configured to report WLAN measurements of one or more WLAN APs of the first set of WLAN APs to an eNB that is communicatively coupled to the first set of WLAN APs via a WLAN Termination (WT), and a second set of WLAN APs supporting LTE/WLAN aggregation with a different set of WLAN data than the set of WLAN data related to the first set of WLAN APs.

Example 8 includes the subject matter of any one of Examples 1-7, including or omitting optional elements, wherein the LTE communication component is further configured to receive an indication from an eNB to initiate mobility from the first set of WLAN APs to a second set of WLAN APs that support LTE/WLAN aggregation with a different set of WLAN data than the set of WLAN data related to the first set of WLAN APs.

Example 9 is a system for an evolved NodeB (eNB) communicatively coupled to a heterogeneous network of a radio access network (RAN), comprising: a memory storing executable instructions that execute one or more computer executable components; and a processor configured to execute the executable instructions for the one or more executable components. The components comprise: a long term evolution (LTE) communication component configured to receive a first set of wireless local area network (WLAN) measurement data related to a first plurality of WLAN access points (APs) and a second set of WLAN measurement data related to a second plurality of WLAN APs; and a WLAN component configured to generate a determination of whether the second plurality of WLAN APs satisfies a criteria more than the first plurality of WLAN APs with respect to a user equipment (UE) device based on the first set of WLAN measurement data and the second set of WLAN measurement data, and, in response to the determination, initiate a WLAN mobility operation to switch from being communicatively coupled to the first plurality of WLAN APs to being communicatively coupled to the second plurality of WLAN APs.

Example 10 includes the subject matter of Example 9, including or omitting optional elements, wherein the WLAN component is further configured to communicate, in response to the determination, WLAN identifiers of WLAN APs associated with the second plurality of WLAN APs that support LTE/WLAN aggregation and enable the UE device to select a WLAN AP from the second plurality of WLAN APs to connect with.

Example 11 includes the subject matter of any one of Examples 9-10, including or omitting optional elements, further comprising an activation component configured to activate LTE/WLAN aggregation by moving at least one bearer to a WLAN to enable communications in LTE and the WLAN simultaneously.

Example 12 includes the subject matter of any one of Examples 9-11, including or omitting optional elements, wherein the LTE component is further configured to configure measurements to be communicated from the UE device of the first plurality of WLAN APs and the second plurality of WLAN APs based on at least one of a request, a period, or an event trigger comprising a predetermined threshold, via an radio resource channel (RRC).

Example 13 includes the subject matter of any one of Examples 9-12, including or omitting optional elements, wherein the WLAN component is further configured to communicate to a WLAN Termination logical node, in response to the determination, at least one WLAN identifier of WLAN APs associated with the second plurality of WLAN APs that support LTE/WLAN aggregation and WLAN authentication/security keys associated with the second plurality of WLAN APs to enable the UE device to select a WLAN AP from the second plurality of WLAN APs to connect with.

Example 14 includes the subject matter of any one of Examples 9-13, including or omitting optional elements, further comprising a buffer component configured to buffer in the memory downlink WLAN PDUs in response to initiating the WLAN mobility operation between the first plurality of WLAN APs and the second plurality of WLAN APs.

Example 15 includes the subject matter of any one of Examples 9-14, including or omitting optional elements, further comprising a tunnel component configured to switch a general packet radio service tunneling protocol user plane (GTP-U) tunnel from a first WLAN Termination logical node associated with the first plurality of WLAN APs to a second WLAN Termination logical node associated with the second plurality of WLAN APs in response to a notification of the WLAN mobility operation from the UE device.

Example 16 is a computer-readable media comprising executable instructions that, in response to execution, cause a system for an evolved NodeB (eNB) comprising one or more processors to perform operations in a heterogeneous network of a radio access network (RAN) for WLAN mobility in LTE/WLAN aggregation. The operations comprise: communicating, via a long term evolution (LTE) link, a first set of wireless local area network (WLAN) data related to a first set of WLAN access points (APs) that enables a user equipment (UE) device to generate a WLAN mobility from a first WLAN AP to a second WLAN AP of the first set of WLAN APs based on a determination by the UE device; indicating, via a WLAN Termination logical node link, a second set of WLAN data that enables a WLAN Termination logical node to configure a second set of WLAN APs for a WLAN connection with the UE device; and prompting, via the long term evolution link, the UE device to select another WLAN mobility from the second WLAN AP of the first set of WLAN APs to another WLAN AP of the second set of WLAN APs.

Example 17 includes the subject matter of Examples 16, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

Example 18 includes the subject matter of any one of Examples 16-17, including or omitting optional elements, wherein the operations further comprise: triggering the WLAN Termination logical node to distribute one or more authentication/security keys to the second set of WLAN APs to enable the second set of WLAN APs to connect with the WLAN Termination logical node and the UE device to select a WLAN AP from the second set of WLAN APs to connect with.

Example 19 includes the subject matter of any one of Examples 16-18, including or omitting optional elements, wherein the operations further comprise: receiving UE measurements, via the LTE link, from the UE device of signal data of one or more WLAN APs of the first set of WLAN APs and of the second set of WLAN APs.

Example 20 includes the subject matter of any one of Examples 16-19, including or omitting optional elements, wherein the operations further comprise: based on the UE measurements, determining whether to initiate a configuration of the second set of WLAN APs with the WLAN Termination logical node, or determining whether to prompt the UE device to initiate the another WLAN mobility to the another WLAN AP of the second set of WLAN APs.

Example 21 includes the subject matter of any one of Examples 16-20, including or omitting optional elements, wherein the operations further comprise: activating LTE/WLAN aggregation, via the WLAN node link, with the second set of WLAN APs by moving a bearer to the WLAN node.

Example 22 is a computer-readable media comprising executable instructions that, in response to execution, cause a system for a user equipment (UE) comprising one or more processors to perform operations in a heterogeneous network of a radio access network (RAN) for WLAN mobility in LTE/WLAN aggregation. The operations comprise: receiving, via a long term evolution (LTE) link, a first set of wireless local area network (WLAN) data related to a first set of WLAN access points (APs); communicatively coupling, via a WLAN connection, to a first WLAN AP; selecting, via the one or more processors, a second WLAN AP from among the first set of WLAN APs based on a measurement of one or more properties of the first set of WLAN APs; and generating, via the UE device, a WLAN mobility operation that switches the WLAN connection from a first WLAN AP of the first set of WLAN APs to a second WLAN AP of the first set of WLAN APs based on the first set of WLAN data.

Example 23 includes the subject matter of any one of Examples 22, including or omitting optional elements, wherein the operations further comprise: receiving measurement configuration data that facilitates another measurement of a second set of WLAN APs; communicating the another measurement of the second set of WLAN APs; and receiving a second set of WLAN data and an indication to generate another WLAN mobility operation from the second WLAN AP of the first set of WLAN APs to another WLAN AP of the second set of WLAN APs by utilizing the second set of WLAN data.

Example 24 includes the subject matter of any one of Examples 22-23, including or omitting optional elements, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

Example 25 includes the subject matter of any one of Examples 22-24, including or omitting optional elements, wherein the operations further comprise: communicating to an eNB communicatively coupled to the first set of WLAN APs and the second set of WLAN APs, via a WLAN termination, a suspend command before the WLAN mobility operation or before the another WLAN mobility operation; and after the WLAN mobility operation or the another WLAN mobility operation, communicating a resume command.

Example 26 is a system comprising: a means for receiving, via a long term evolution (LTE) link, a first set of wireless local area network (WLAN) data related to a first set of WLAN access points (APs); a means for communicatively coupling, via a WLAN connection, to a first WLAN AP; a means for selecting a second WLAN AP from among the first set of WLAN APs based on a measurement of one or more properties of the first set of WLAN APs; and a means for generating a WLAN mobility operation that switches the WLAN connection from a first WLAN AP of the first set of WLAN APs to a second WLAN AP of the first set of WLAN APs based on the first set of WLAN data.

Example 27 includes the subject matter of Examples 26, further comprising: a means for receiving measurement configuration data that facilitates another measurement of a second set of WLAN APs; a means for communicating the another measurement of the second set of WLAN APs; and a means for receiving a second set of WLAN data and an indication to generate another WLAN mobility operation from the second WLAN AP of the first set of WLAN APs to another WLAN AP of the second set of WLAN APs by utilizing the second set of WLAN data.

Example 28 includes the subject matter of any one of Examples 26-27, including or omitting optional elements, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

Example 29 includes the subject matter of any one of Examples 26-28, including or omitting optional elements, further comprising: a means for communicating to an eNB communicatively coupled to the first set of WLAN APs and the second set of WLAN APs, via a WLAN termination, a suspend command before the WLAN mobility operation or before the another WLAN mobility operation; and a means for, after the WLAN mobility operation or the another WLAN mobility operation, communicating a resume command; a means for receiving measurement configuration data that facilitates another measurement of a second set of WLAN APs; a means for communicating the another measurement of the second set of WLAN APs; and a means for receiving a second set of WLAN data and an indication to generate another WLAN mobility operation from the second WLAN AP of the first set of WLAN APs to another WLAN AP of the second set of WLAN APs by utilizing the second set of WLAN data.

Example 30 includes the subject matter of any one of Examples 26-29, including or omitting optional elements, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program acces-sible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A system for a user equipment (UE) device, coupled to a heterogeneous network of a radio access network (RAN), comprising:
a memory storing executable instructions that execute one or more computer executable components; and
a processor configured to execute the executable instructions for the one or more executable components comprising:
a long term evolution (LTE) communication component configured to receive a set of wireless local area network (WLAN) data related to a first set of WLAN access points (APs) that enables a WLAN mobility operation among the first set of WLAN APs; and
a WLAN component configured to communicatively couple to a first WLAN AP of the first set of WLAN APs, generate a determination of whether a second WLAN AP satisfies a communication criteria more than the first WLAN AP, and, in response to the determination, initiate the WLAN mobility operation to switch from being communicatively coupled to the first WLAN AP to being communicatively coupled to the second WLAN AP by utilizing the set of WLAN data;
wherein the LTE communication component is further configured to communicate a suspend command to an evolved NodeB (eNB) to stop traffic via a first WiFi network of the first WLAN AP and communicate a resume command to the eNB to resume traffic via a second WiFi network of the second WLAN AP.

2. The system of claim 1, wherein the set of WLAN data comprises WLAN identifiers identifying one or more WLAN APs of the first set of WLAN APs that support a LTE/WLAN aggregation protocol.

3. The system of claim 2, wherein the set of WLAN data further comprises one or more WLAN AP priorities of the first set of WLAN APs or one or more WLAN authentication/security keys of the first set of WLAN APs.

4. The system of claim 1, wherein the LTE communication component is further configured to communicatively couple to the eNB during the WLAN mobility operation while switching from being communicatively coupled to the first WLAN AP to being communicatively coupled to the second WLAN AP, via a WLAN Termination (WT).

5. The system of claim 4, wherein the LTE communication component is further configured to notify the eNB of the WLAN mobility operation from the first WLAN AP to the second WLAN AP via a radio resource control (RRC) connection, after a successful connection to the second WLAN AP.

6. The system of claim 1, further comprising:
a status reporting component configured to report WLAN measurements of one or more WLAN APs of the first set of WLAN APs to an eNB that is communicatively coupled to the first set of WLAN APs via a WLAN Termination (WT), and report WLAN measurements of a second set of WLAN APs supporting LTE/WLAN aggregation with a different set of WLAN data than the set of WLAN data related to the first set of WLAN APs.

7. The system of claim 1, wherein the LTE communication component is further configured to receive an indication from the eNB to initiate mobility from the first set of WLAN APs to a second set of WLAN APs that support LTE/WLAN aggregation with a different set of WLAN data than the set of WLAN data related to the first set of WLAN APs.

8. A system for an evolved NodeB (eNB) communicatively coupled to a heterogeneous network of a radio access network (RAN), comprising:
a memory storing executable instructions that execute one or more computer executable components; and
a processor configured to execute the executable instructions for the one or more executable components comprising:
a long term evolution (LTE) communication component configured to receive a first set of wireless local area network (WLAN) measurement data related to a first plurality of WLAN access points (APs) and a second set of WLAN measurement data related to a second plurality of WLAN APs; and
a WLAN component configured to generate a determination of whether the second plurality of WLAN APs satisfies a criteria more than the first plurality of WLAN APs with respect to a user equipment (UE) device based on the first set of WLAN measurement data and the second set of WLAN measurement data, and, in response to the determination, initiate a WLAN mobility operation to switch from being communicatively coupled to the first plurality of WLAN APs to being communicatively coupled to the second plurality of WLAN APs.

9. The system of claim 8, wherein the WLAN component is further configured to communicate, in response to the determination, WLAN identifiers of WLAN APs associated with the second plurality of WLAN APs that support LTE/WLAN aggregation and enable the UE device to select a WLAN AP from the second plurality of WLAN APs to connect with.

10. The system of claim 8, further comprising an activation component configured to activate LTE/WLAN aggregation by moving at least one bearer to a WLAN to enable communications in LTE and the WLAN simultaneously.

11. The system of claim 8, wherein the LTE component is further configured to configure measurements to be communicated from the UE device of the first plurality of WLAN APs and the second plurality of WLAN APs based on at least one of a request, a period, or an event trigger comprising a predetermined threshold, via an radio resource channel (RRC).

12. The system of claim 8, wherein the WLAN component is further configured to communicate to a WLAN Termination logical node, in response to the determination, at least one WLAN identifier of WLAN APs associated with the second plurality of WLAN APs that support LTE/WLAN aggregation and WLAN authentication/security keys associated with the second plurality of WLAN APs to enable the UE device to select a WLAN AP from the second plurality of WLAN APs to connect with.

13. The system of claim 8, further comprising a buffer component configured to buffer in the memory downlink WLAN PDUs in response to initiating the WLAN mobility operation between the first plurality of WLAN APs and the second plurality of WLAN APs.

14. The system of claim 8, further comprising a tunnel component configured to switch a general packet radio service tunneling protocol user plane (GTP-U) tunnel from a first WLAN Termination logical node associated with the first plurality of WLAN APs to a second WLAN Termination logical node associated with the second plurality of WLAN APs in response to a notification of the WLAN mobility operation from the UE device.

15. A non-transitory computer-readable media comprising executable instructions that, in response to execution, cause a system for an evolved NodeB (eNB) comprising one or more processors to perform operations in a heterogeneous network of a radio access network (RAN) for WLAN mobility in LTE/WLAN aggregation, comprising:
   communicating, via a long term evolution (LTE) link, a first set of wireless local area network (WLAN) data related to a first set of WLAN access points (APs) that enables a user equipment (UE) device to generate a WLAN mobility from a first WLAN AP to a second WLAN AP of the first set of WLAN APs based on a determination by the UE device;
   indicating, via a WLAN Termination logical node link, a second set of WLAN data that enables a WLAN Termination logical node to configure a second set of WLAN APs for a WLAN connection with the UE device; and
   prompting, via the long term evolution link, the UE device to select another WLAN mobility from the second WLAN AP of the first set of WLAN APs to another WLAN AP of the second set of WLAN APs.

16. The non-transitory computer-readable media of claim 15, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

17. The non-transitory computer-readable media of claim 15, wherein the operations further comprise:
   triggering the WLAN Termination logical node to distribute one or more authentication/security keys to the second set of WLAN APs to enable the second set of WLAN APs to connect with the WLAN Termination logical node and the UE device to select a WLAN AP from the second set of WLAN APs to connect with.

18. The non-transitory computer-readable media of claim 15, wherein the operations further comprise:
   receiving UE measurements, via the LTE link, from the UE device of signal data of one or more WLAN APs of the first set of WLAN APs and of the second set of WLAN APs.

19. The non-transitory computer-readable media of claim 15, wherein the operations further comprise:
   based on the UE measurements, determining whether to initiate a configuration of the second set of WLAN APs with the WLAN Termination logical node, or determining whether to prompt the UE device to initiate the another WLAN mobility to the another WLAN AP of the second set of WLAN APs.

20. The non-transitory computer-readable media of claim 15, wherein the operations further comprise:
   activating LTE/WLAN aggregation, via the WLAN node link, with the second set of WLAN APs by moving a bearer to the WLAN node.

21. A non-transitory computer-readable media comprising executable instructions that, in response to execution, cause a system for a user equipment (UE) comprising one or more processors to perform operations in a heterogeneous network of a radio access network (RAN) for WLAN mobility in LTE/WLAN aggregation, comprising:
   receiving, via a long term evolution (LTE) link, a first set of wireless local area network (WLAN) data related to a first set of WLAN access points (APs);
   communicatively coupling, via a WLAN connection, to a first WLAN AP;
   selecting, via the one or more processors, a second WLAN AP from among the first set of WLAN APs based on a measurement of one or more properties of the first set of WLAN APs;
   generating, via the UE device, a WLAN mobility operation that switches the WLAN connection from a first WLAN AP of the first set of WLAN APs to a second WLAN AP of the first set of WLAN APs based on the first set of WLAN data;
   communicating to the eNB communicatively coupled to the first set of WLAN APs and the second set of WLAN APs, via a WLAN termination, a suspend command before the WLAN mobility operation or before the another WLAN mobility operation; and
   after the WLAN mobility operation or the another WLAN mobility operation, communicating a resume command.

22. The non-transitory computer-readable media of claim 21, wherein the operations further comprise:
   receiving measurement configuration data that facilitates another measurement of a second set of WLAN APs;
   communicating the another measurement of the second set of WLAN APs; and
   receiving a second set of WLAN data and an indication to generate another WLAN mobility operation from the second WLAN AP of the first set of WLAN APs to another WLAN AP of the second set of WLAN APs by utilizing the second set of WLAN data.

23. The non-transitory computer-readable media of claim 22, wherein the first set of WLAN data comprises a WLAN identifier identifying the second WLAN AP of the first set of WLAN APs, and the second set of WLAN data comprises a plurality of WLAN identifiers associated with WLAN APs of the second set of WLAN APs and one or more WLAN authentication/security keys associated with the second set of WLAN APs.

* * * * *